US011332603B2

(12) United States Patent
Mileva et al.

(10) Patent No.: US 11,332,603 B2
(45) Date of Patent: May 17, 2022

(54) POLYPROPYLENE COMPOSITION WITH EXCELLENT SURFACE APPEARANCE

(71) Applicant: BOREALIS AG, Wagramerstrasse (AT)

(72) Inventors: Daniela Mileva, Linz (AT); Susanne Kahlen, Linz (AT); Georg Grestenberger, Linz (AT); Anton Sageder, Linz (AT); Christof Wurnitsch, Linz (AT); Anna Hartl, Linz (AT); Patrick Rover, Linz (AT); Erwin Pirklbauer, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/622,532

(22) PCT Filed: Jun. 26, 2018

(86) PCT No.: PCT/EP2018/067115
§ 371 (c)(1),
(2) Date: Dec. 13, 2019

(87) PCT Pub. No.: WO2019/002294
PCT Pub. Date: Jan. 3, 2019

(65) Prior Publication Data
US 2020/0207960 A1 Jul. 2, 2020

(30) Foreign Application Priority Data
Jun. 30, 2017 (EP) ..................... 17179064

(51) Int. Cl.
C08L 23/12 (2006.01)
C08K 3/34 (2006.01)
C08K 5/092 (2006.01)
C08K 5/098 (2006.01)
C08L 23/08 (2006.01)
C08L 23/14 (2006.01)

(52) U.S. Cl.
CPC ............... C08L 23/12 (2013.01); C08K 3/34 (2013.01); C08K 5/092 (2013.01); C08K 5/098 (2013.01); C08L 23/0815 (2013.01); C08L 23/14 (2013.01); C08L 2203/14 (2013.01); C08L 2205/03 (2013.01); C08L 2207/02 (2013.01); C08L 2207/062 (2013.01)

(58) Field of Classification Search
CPC .. C08L 23/14; C08L 2205/02; C08L 2203/14; C08L 2205/03; C08L 2207/02; C08L 2207/062; C08L 23/12; C08L 23/0815; C08K 3/34; C08K 5/092; C08K 5/098
See application file for complete search history.

(56) References Cited

U.S. PATENT DOCUMENTS

| 6,300,415 | B1* | 10/2001 | Okayama | B32B 27/32 525/191 |
|---|---|---|---|---|
| 9,388,304 | B2* | 7/2016 | Tranninger | C08L 23/12 |
| 9,701,825 | B2* | 7/2017 | Grestenberger | C08F 210/06 |
| 9,777,142 | B2* | 10/2017 | Sandholzer | C08L 23/16 |
| 9,783,666 | B2* | 10/2017 | Grestenberger | C08L 23/142 |
| 10,155,828 | B2* | 12/2018 | Grestenberger | C08K 3/34 |
| 10,221,305 | B2* | 3/2019 | Grestenberger | C08L 23/12 |
| 10,472,509 | B2* | 11/2019 | Grestenberger | C08L 23/16 |
| 10,745,548 | B2* | 8/2020 | Kniesel | C08L 23/12 |
| 2010/0317779 | A1* | 12/2010 | Pham | C08L 23/10 524/141 |
| 2013/0203908 | A1* | 8/2013 | Kock | C08L 23/142 524/119 |
| 2014/0371339 | A1* | 12/2014 | Langenfelder | C08L 23/12 521/139 |
| 2015/0299443 | A1* | 10/2015 | Tranninger | C08F 210/06 524/528 |

FOREIGN PATENT DOCUMENTS

| EP | 0491566 B2 | 6/1992 |
|---|---|---|
| EP | 0586390 B1 | 5/1997 |
| EP | 0591224 B1 | 2/1998 |
| EP | 0887379 B1 | 12/2004 |
| EP | 2275485 A1 | 1/2011 |
| EP | 2325244 A1 | 5/2011 |

(Continued)

OTHER PUBLICATIONS

Busico, et al., "Microstructure of polypropylene", Prog. Polym. Sci. 26 (2001) pp. 443-533.
Busico, et al., "Full Assignment of the 13C NMR Spectra of Regioregular Polypropylenes: Methyl and Methylene Region", Macromolecules 1997, 30, 6251-6263.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
H.N. Cheng, "13C NMR Analysis of Ethylene-Propylene Rubbers", Macromolecules 1984, 17, 1950-1955.
Extended European Search Report for Patent Application No. 17179064.5-1302, dated Nov. 17, 2017.

(Continued)

Primary Examiner — Irina S Zemel
Assistant Examiner — Jeffrey S Lenihan
(74) Attorney, Agent, or Firm — Tarolli, Sundheim, Covell & Tummino LLP

(57) ABSTRACT

The present invention is directed to a polypropylene composition (C) comprising a heterophasic propylene copolymer (HECO1) having an intrinsic viscosity (IV) of the xylene soluble fraction (XCS) above 3.5 dl/g, an inorganic filler (F) and a nucleating agent (NU) being a dicarboxylic acid and/or a salt thereof. Further, the present invention is directed to the use of said polypropylene composition (C) for the production of a foamed article as well as a foamed article comprising said polypropylene composition (C). The present invention is also directed to the use of a nucleating agent (NU) being dicarboxylic acid and/or a salt thereof for the reduction of tigerskin of a polypropylene composition.

18 Claims, No Drawings

(56) References Cited

FOREIGN PATENT DOCUMENTS

| | | | |
|---|---|---|---|
| EP | 2738215 A1 | 6/2014 | |
| EP | 3181625 A1 | 6/2017 | |
| KR | 20120030062 A | 3/2012 | |
| KR | 20150074211 A | 7/2015 | |
| KR | 20150086319 A | 7/2015 | |
| WO | 87/07620 A1 | 12/1987 | |
| WO | 92/12182 A1 | 7/1992 | |
| WO | 92/19653 A1 | 11/1992 | |
| WO | 92/19658 A1 | 11/1992 | |
| WO | 99/24478 A1 | 5/1999 | |
| WO | 99/24479 A1 | 5/1999 | |
| WO | 00/68315 A1 | 11/2000 | |
| WO | 2004/000899 A1 | 12/2003 | |
| WO | 2004/111095 A1 | 12/2004 | |
| WO | 2011/160645 A1 | 12/2011 | |
| WO | 2011/160945 A1 | 12/2011 | |
| WO | 2011/160953 A1 | 12/2011 | |
| WO | WO2014082188 A1 * | 6/2014 | |
| WO | 2017009193 A1 | 1/2017 | |
| WO | 20170102935 A1 | 6/2017 | |
| WO | 2019/002294 A1 | 1/2019 | |

OTHER PUBLICATIONS

Filip, et al., Heteronuclear decoupling under fast MAS by a rotor-synchronized Hahn-echo pulse train, Journal of Magnetic Resonance 176 (2005) 239-243.

Griffin, et al., Low-load rotor-synchronised Hahn-echo pulse train (RS-HEPT) 1H decoupling in solid-state NMR factors affecting MAS spin-echo dephasing times, Magn. Reson. Chem. 2007; 45: S198-S208.

Zweifel, et al., "Plastics Additives Handbook", 6th Edition, Department of Materials, Institute of Polymers, 2009, pp. 1141-1190.

Kakugo, et al., "13C NMR Determination of Monomer Sequence Distribution in Ethylene-Propylene Copolymers Prepared with 6-TiC13-Al( C2H5%) Cl", Macromolecules 1982,15, 1150-1152.

Klimke, et al., "Optimisation and Application of Polyolefin Branch Quantification by Melt-State 13C NMR Spectroscopy", Macromol. Chern. Phys. 2006, pp. 382-395.

Parkinson, et al., "Effect of Branch Length on 13C NMR Relaxation Properties in Molten Poly[ethylene-co-(a-olefin)] Model Systems", 2007, pp. 21828-2133.

Zweifel, et al., "Plastics Additives Handbook", 5th Edition, Department of Materials, Institute of Polymers, 2001.

Pollard, et al., "Observation of Chain Branching in Polyethylene in the Solid State and Melt via 13C NMR Spectroscopy and Melt NMR Relaxation Time Measurements", Macromolecules 2004, pp. 813-825.

James C. Randall, "A Review of High Resolution Liquid 13Carbon Nuclear Magnetic Resonance Characterizations of Ethylene-Based Polymers", C29 201, 1989.

Resconi et al., "Selectivity in Propene Polymerization with Metallocene Catalysts", Chem. Rev. 2000, 100, pp. 1253-1345.

Singh et al., "Triad sequence determination of ethylene-propylene copolymers—application of quantitative 13C NMR", Polymer Testing 28 (2009) pp. 475-479.

Frank, et al., "GS-VIII : OP18 New Measurement Method for Appearance of Flow Marks or Tiger Stripes Defect for Improved Quantification and Analysis", PPS 25, Mar. 15, 2009.

Wang et al., "Structural Analysis of Ethylene/Propylene Copolymers Synthesized with a Constrained Geometry Catalyst", Macromolecules 2000, 33, pp. 1157-1162.

Zhou et al., "A new decoupling method for accurate quantification of polyethylene copolymer composition and triad sequence distribution with 13C NMR", Journal of Magnetic Resonance 187 (2007) pp. 225-233.

Applicant: Borealis AG; Korean Application No. 10-2020-7001007; "Polypropylene Composition With Excellent Surface Appearance"; Korean Office Action; dated Dec. 11, 2020; 19 pgs.

Eurasian Office Action for Application No. 201992718 dated Mar. 29, 2021; 5 pgs.

Applicant: Borealis AG; "Polypropylene Composition with Excellent Surface Appearance"; Chinese Application No. 201880038830.X; Office Action dated Oct. 11, 2021; 19 pgs.

Eurasian Application No. 201992718; Eurasian Office Action dated Oct. 18, 2021; 4 pgs.

* cited by examiner

POLYPROPYLENE COMPOSITION WITH EXCELLENT SURFACE APPEARANCE

The present invention is directed to a polypropylene composition (C) comprising a heterophasic propylene copolymer (HECO1) having an intrinsic viscosity (IV) of the xylene soluble fraction (XCS) above 3.5 dl/g, an inorganic filler (F) and a nucleating agent (NU) being a dicarboxylic acid and/or a salt thereof. Further, the present invention is directed to the use of said polypropylene composition (C) for the production of a foamed article as well as a foamed article comprising said polypropylene composition (C). The present invention is also directed to the use of a nucleating agent (NU) being dicarboxylic acid and/or a salt thereof for the reduction of tigerskin of a polypropylene composition.

Recent demand for plastics in the automotive industry is towards weight reduction with preservation of the mechanical property profile and surface appearance. The European Union has approved tough $CO_2$ limits which mandates the car manufacturers (OEM) to cut emission from current 160 to 120 g/km by 2012-2015. Thus, car manufacturers are looking for weight saving solutions to fulfil the legislation. One approach to prepare polypropylene compositions featured by a reduced density is the application of compositions containing inorganic fillers or glass fibres. However, the density reduction by application of inorganic filler or glass fibre reinforced polypropylene compounds is limited.

Therefore, a possible next step to support further weight reduction is foaming during the injection-moulding conversion step which can be applied for non-visible and visible automotive parts. Foamed parts have the advantage of reduced density but poor surface and sacrificed mechanical properties. Thus, the majority of foamed parts are not used for visible interior/exterior applications.

Accordingly, there is a need in the art for a foamable polypropylene composition featured by a good mechanical property profile accompanied by an excellent surface appearance.

Therefore, it is an object of the present invention to provide a polypropylene composition with high flow rate, good dimensional stability, good balance of mechanical properties and surface appearance and last but not least preserving this property profile in foamed parts.

The finding of the present invention is that a filled heterophasic polypropylene composition comprising a high molecular weight elastomeric fraction and a nucleating agent being a dicarboxylic acid is applicable for the preparation of foamed parts showing excellent mechanical properties and a good surface appearance.

Accordingly, the present invention is directed to a polypropylene composition (C), comprising
a) a heterophasic propylene copolymer (HECO1) having an intrinsic viscosity (IV) of the xylene soluble fraction (XCS) above 3.5 dl/g, said heterophasic propylene copolymer (HECO1) comprising
  i) a matrix being a propylene polymer (M1) and
  ii) an elastomeric propylene copolymer (E1) being dispersed in said matrix,
b) an inorganic filler (F), and
c) a nucleating agent (NU) being a dicarboxylic acid and/or a salt thereof.

According to one embodiment of the present invention, the heterophasic propylene copolymer (HECO1) has a comonomer content of the xylene soluble fraction (XCS) below 40.0 mol-%.

According to another embodiment of the present invention, the polypropylene composition (C) further comprises a heterophasic propylene copolymer (HECO2) having a comonomer content of the xylene soluble fraction (XCS) equal or above 40.0 mol-%, said first heterophasic propylene copolymer comprising
  i) a matrix being a first propylene polymer (M2) and
  ii) an elastomeric propylene copolymer (E2) being dispersed in said matrix.

According to another embodiment of the present invention, the polypropylene composition (C) further comprises a high density polyethylene (HDPE) and/or a plastomer (PL) being a copolymer of ethylene and a $C_4$ to $C_8$ α-olefin.

According to one embodiment of the present invention, the polypropylene composition (C) comprises
  i) 15.0 to 35.0 wt.-% of the heterophasic propylene copolymer (HECO1),
  ii) 36.0 to 60.0 wt.-% of the heterophasic propylene copolymer (HECO2),
  iii) 5.0 to 30.0 wt.-% of the inorganic filler (F),
  iv) 0.001 to 2.0 wt.-% of the nucleating agent (NU),
  v) optionally 2.0 to 10.0 wt.-% of the high density polyethylene (HDPE), and
  vi) optionally 5.0 to 15.0 wt.-% of the plastomer (PL) being a copolymer of ethylene and a $C_4$ to $C_8$ α-olefin,
based on the overall polypropylene composition (C).

According to another embodiment of the present invention, the heterophasic propylene copolymer (HECO1) has
  i) a melt flow rate $MFR_2$ (230° C.) determined according to ISO 1133 in the range of 1.0 to 20.0 g/10 min, and/or
  ii) a comonomer content in the range of 5.0 to 30.0 mol-%, and/or
  iii) a xylene soluble fraction (XCS) in the range of 15.0 to 40.0 wt.-%.

According to still another embodiment of the present invention, the heterophasic propylene copolymer (HECO2) has
  i) a melt flow rate $MFR_2$ (230° C.) determined according to ISO 1133 in the range of 50 to 120 g/10 min, and/or
  ii) a comonomer content in the range of 4.0 to 30.0 mol-%, and/or
  iii) a xylene soluble fraction (XCS) in the range of 8.0 to 35.0 wt.-%.

It is especially preferred that the first propylene polymer (M1) and/or the second propylene polymer (M2) are propylene homopolymers.

According to one embodiment of the present invention, the first elastomeric propylene copolymer (E1) and/or the second elastomeric propylene copolymer (E2) are copolymers of propylene and ethylene.

According to another embodiment of the present invention, the polypropylene composition (C) has a melt flow rate $MFR_2$ (230° C.) determined according to ISO 1133 in the range of 10.0 to 40.0 g/10 min.

According to a further embodiment of the present invention, the plastomer (PL) is a copolymer of ethylene and 1-octene.

According to one embodiment of the present invention, the inorganic filler (F) is talc and/or wollastonite.

It is especially preferred that the nucleating agent (NU) is 1,2-cyclohexane dicarboxylic acid and/or a salt thereof.

The present invention is also directed to the use of a nucleating agent (NU) being a dicarboxylic acid and/or a salt thereof to reduce tigerskin of a polypropylene composition (C) as described above.

The present invention is further directed to the use of the polypropylene composition (C) as described above for the production of a foamed article.

The present invention is also directed to a foamed article, preferably foamed automotive article, comprising the polypropylene composition (C) as described above.

In the following, the present invention is described in more detail.

The Polypropylene Composition (C)

The inventive polypropylene composition (C) comprises a heterophasic propylene copolymer (HECO1) comprising a matrix (M1) being a propylene polymer (PP1) and an elastomeric propylene copolymer (E1) being dispersed in said matrix. Thus the matrix (M1) contains (finely) dispersed inclusions being not part of the matrix (M1) and said inclusions contain the elastomeric propylene copolymer (E1). The term inclusion indicates that the matrix (M1) and the inclusion form different phases as defined below.

Further, the inventive polypropylene composition comprises an inorganic filler (F) and a nucleating agent (NU) being a dicarboxylic acid and/or a salt thereof.

Accordingly, it is preferred that the polypropylene composition (C) comprises at least 15.0 wt.-%, more preferably at least 20.0 wt.-%, still more preferably at least 25.0 wt.-% of the heterophasic propylene copolymer (HECO1), 5.0 to 30.0 wt.-%, more preferably 8.0 to 25.0 wt.-%, still more preferably 12.0 to 16.0 wt.-% of the inorganic filler (F) and 0.001 to 2.0 wt.-%, more preferably 0.01 to 1.0 wt.-%, still more preferably 0.05 to 0.1 wt.-% of the nucleating agent (NU), based on the overall weight of the polypropylene composition (C).

According to a preferred embodiment of the present invention, the polypropylene composition (C) further comprises a heterophasic propylene copolymer (HECO2) which is different from the heterophasic propylene copolymer (HECO1).

Said heterophasic propylene copolymer (HECO2) comprises a matrix (M2) being a propylene polymer (PP2) and an elastomeric propylene copolymer (E2) being dispersed in said matrix. Thus the matrix (M2) contains (finely) dispersed inclusions being not part of the matrix (M2) and said inclusions contain the elastomeric propylene copolymer (E2).

Therefore, in case the polypropylene composition (C) comprises the heterophasic propylene copolymer (HECO2), the polypropylene composition (C) comprises a heterophasic system comprising a matrix (M) formed by the propylene polymer (PP1) and the propylene polymer (PP2), and the first elastomeric propylene copolymer (E1) and the second elastomeric propylene copolymer (E2) are dispersed in said matrix (M). Thus the matrix (M) contains (finely) dispersed inclusions being not part of the matrix (M) and said inclusions contain the elastomeric propylene copolymer (E1) and the elastomeric propylene copolymer (E2).

It is preferred that the polypropylene composition (C) comprises 15.0 to 35.0 wt.-%, more preferably 18.0 to 30.0 wt.-%, still more preferably 22.0 to 27.0 wt.-% of the heterophasic propylene copolymer (HECO1), 36.0 to 60.0 wt.-%, more preferably 37.0 to 53.0 wt.-%, still more preferably 38.0 to 45.0 wt.-% of the heterophasic propylene copolymer (HECO2), 5.0 to 30.0 wt.-%, more preferably 8.0 to 25.0 wt.-%, still more preferably 12.0 to 16.0 wt.-% of the inorganic filler (F) and 0.001 to 2.0 wt.-%, more preferably 0.01 to 1.0 wt.-%, still more preferably 0.05 to 0.1 wt.-% of the nucleating agent (NU), based on the overall weight of the polypropylene composition (C).

Preferably, the polypropylene composition (C) contains the propylene polymer (PP1) and the propylene polymer (PP2) forming the matrix (M) in a ratio of 1:1 to 3:1 and the elastomeric propylene copolymer (E1) and the elastomeric propylene copolymer (E2) in a ratio of 1:1 to 3:1.

Accordingly, it is preferred that the polypropylene composition (C) comprises, 40 to 63 wt.-%, more preferably 46 to 60 wt.-%, still more preferably 50 to 53 wt.-% of the propylene polymer (PP1), 20 to 32 wt.-%, more preferably 23 to 30 wt.-%, still more preferably 25 to 27 wt.-% of the propylene polymer (PP2) and 3 to 26 wt.-%, more preferably 7 to 20 wt.-%, still more preferably 13 to 17 wt.-% of the elastomeric propylene copolymer (E1) and 2 to 14 wt.-%, more preferably 3 to 10 wt.-%, still more preferably 6 to 8 wt.-% of the elastomeric propylene copolymer (E2) 5.0 to 30.0 wt.-%, more preferably 8.0 to 25.0 wt.-%, still more preferably 12.0 to 16.0 wt.-% of the inorganic filler (F) and 0.001 to 2.0 wt.-%, more preferably 0.01 to 1.0 wt.-%, still more preferably 0.05 to 0.1 wt.-% of the nucleating agent (NU), based on the overall weight of the polypropylene composition (C).

Further, it is preferred that the polypropylene composition (C) comprises a high density polyethylene (HDPE).

Therefore, it is preferred that the polypropylene composition (C) comprises 15.0 to 35.0 wt.-%, more preferably 18.0 to 30.0 wt.-%, still more preferably 22.0 to 27.0 wt.-% of the heterophasic propylene copolymer (HECO1), 36.0 to 60.0 wt.-%, more preferably 37.0 to 53.0 wt.-%, still more preferably 38.0 to 45.0 wt.-% of the heterophasic propylene copolymer (HECO2), 2.0 to 10.0 wt.-%, more preferably 3.0 to 8.0 wt.-%, still more preferably 4.0 to 6.0 wt.-% of the high density polyethylene (HDPE), 5.0 to 30.0 wt.-%, more preferably 8.0 to 25.0 wt.-%, still more preferably 12.0 to 16.0 wt.-% of the inorganic filler (F) and 0.001 to 2.0 wt.-%, more preferably 0.01 to 1.0 wt.-%, still more preferably 0.05 to 0.1 wt.-% of the nucleating agent (NU), based on the overall weight of the polypropylene composition (C).

Additionally or alternatively to the previous paragraph, it is preferred that the polypropylene composition (C) further comprises a plastomer (PL) being a copolymer of ethylene and a $C_4$ to $C_8$ α-olefin.

Accordingly, it is preferred that the polypropylene composition (C) comprises 15.0 to 35.0 wt.-%, more preferably 18.0 to 30.0 wt.-%, still more preferably 22.0 to 27.0 wt.-% of the heterophasic propylene copolymer (HECO1), 36.0 to 60.0 wt.-%, more preferably 37.0 to 53.0 wt.-%, still more preferably 38.0 to 45.0 wt.-% of the heterophasic propylene copolymer (HECO2), 2.0 to 10.0 wt.-%, more preferably 3.0 to 8.0 wt.-%, still more preferably 4.0 to 6.0 wt.-% of the high density polyethylene (HDPE), 5.0 to 15.0 wt.-%, more preferably 6.0 to 12.0 wt.-%, still more preferably 7.0 to 10.0 wt.-% of the plastomer (PL), 5.0 to 30.0 wt.-%, more preferably 8.0 to 25.0 wt.-%, still more preferably 12.0 to 16.0 wt.-% of the inorganic filler (F) and 0.001 to 2.0 wt.-%, more preferably 0.01 to 1.0 wt.-%, still more preferably 0.05 to 0.1 wt.-% of the nucleating agent (NU), based on the overall weight of the polypropylene composition (C).

Preferably, the polypropylene composition (C) is obtained by a sequential polymerization process wherein at least two, like three, reactors are connected in series. For example, said process comprises the steps of a) polymerizing propylene and optionally ethylene in a first reactor (R1) to obtain the propylene polymer (PP1),
b) transferring the propylene polymer (PP1) into a second reactor (R2),
c) polymerizing in said second reactor (R2) in the presence of said propylene polymer (PP1) propylene and optionally ethylene obtaining the propylene polymer (PP2), said propylene polymer (PP1) and said propylene polymer (PP2) form the matrix (M), d) transferring the matrix (M) into a third reactor (R3),
e) polymerizing in said third reactor (R3) in the presence of the matrix (M) propylene and/or a $C_4$ to $C_8$ α-olefin, obtaining a third polymer fraction, said polymer fraction is the elastomeric propylene copolymer (E1),
f) transferring the matrix (M) and the elastomeric propylene copolymer (E1) into a fourth reactor (R4),
g) polymerizing in said fourth reactor (R4) in the presence of the matrix (M) and the elastomeric propylene copolymer (E1) propylene and/or a $C_4$ to $C_8$ α-olefin, obtaining a fourth polymer fraction, said polymer fraction is the elastomeric propylene copolymer (E2), said matrix (M) and said elastomeric propylene copolymer (E1) and said elastomeric propylene copolymer (E2) form a heterophasic propylene copolymer,
h) melt blending said heterophasic propylene copolymer obtained in the fourth reactor (R4) with the inorganic filler (F), the nucleating agent (NU), optionally the high density polyethylene (HDPE) and optionally the plastomer (PL).

Alternatively, the polypropylene composition (C) is obtained by melt blending the first heterophasic propylene copolymer (HECO1) comprising a matrix (M1) being the propylene polymer (PP1) and a dispersed phase being the elastomeric propylene copolymer (E1), the second heterophasic propylene copolymer (HECO2) comprising a matrix (M2) being the propylene polymer (PP2) and a dispersed phase being the elastomeric propylene copolymer (E2), the inorganic filler (F), the nucleating agent (NU), optionally the high density polyethylene (HDPE) and optionally the plastomer (PL). Melt blending of said first heterophasic propylene copolymer (HECO1) and said second heterophasic propylene copolymer (HECO2) results in a heterophasic system wherein the propylene polymer (PP1) and the propylene polymer (PP2) form the matrix (M) and the elastomeric propylene copolymer (E1) and the elastomeric propylene copolymer (E2) form the dispersed phase.

It is especially preferred that the polypropylene composition (C) is obtained by melt blending said first heterophasic propylene copolymer (HECO1) and said second heterophasic propylene copolymer (HECO2) with the inorganic filler (F), the nucleating agent (NU) and optionally the high density polyethylene (HDPE) and/or the plastomer (PL).

Preferably, the polypropylene composition (C) according to this invention comprises as polymer components only the heterophasic propylene copolymer (HECO1), the heterophasic propylene copolymer (HECO2), the high density polyethylene (HDPE) and the plastomer (PL). In other words, the polypropylene composition (C) may contain further additives but no other polymer in an amount exceeding 5.0 wt.-%, more preferably exceeding 3.0 wt.-%, like exceeding 1.0 wt.-%, based on the total polypropylene composition (C). One additional polymer which may be present in such low amounts is a polyethylene which is a reaction by-product obtained by the preparation of the polypropylene composition (C). Accordingly, it is in particular appreciated that the instant polypropylene composition (C) contains only the heterophasic propylene copolymer (HECO1), the heterophasic propylene copolymer (HECO2), the high density polyethylene (HDPE) and the plastomer (PL) and optionally polyethylene in amounts as mentioned in this paragraph.

The polypropylene composition (C) of the present invention may include additives (AD).

Accordingly, it is preferred that the polypropylene composition (C) comprises, more preferably consists of, 15.0 to 35.0 wt.-%, more preferably 18.0 to 30.0 wt.-%, still more preferably 22.0 to 27.0 wt.-% of the heterophasic propylene copolymer (HECO1), 36.0 to 60.0 wt.-%, more preferably 37.0 to 53.0 wt.-%, still more preferably 38.0 to 45.0 wt.-% of the heterophasic propylene copolymer (HECO2), 2.0 to 10.0 wt.-%, more preferably 3.0 to 8.0 wt.-%, still more preferably 4.0 to 6.0 wt.-% of the high density polyethylene (HDPE), 5.0 to 15.0 wt.-%, more preferably 6.0 to 12.0 wt.-%, still more preferably 7.0 to 10.0 wt.-% of the plastomer (PL), 5.0 to 30.0 wt.-%, more preferably 8.0 to 25.0 wt.-%, still more preferably 12.0 to 16.0 wt.-% of the inorganic filler (F), 0.001 to 2.0 wt.-%, more preferably 0.01 to 1.0 wt.-%, still more preferably 0.05 to 0.1 wt.-% of the nucleating agent (NU) and 0.0 to 5.0 wt.-%, more preferably 0.05 to 4.0 wt.-%, still more preferably 0.1 to 3.0 wt.-% of additives (AD), based on the overall weight of the polypropylene composition (C). The additives (AD) are described in more detail below.

It is preferred that the polypropylene composition (C) has a moderate melt flow rate. Thus, it is preferred that the melt flow rate $MFR_2$ (230° C., 2.16 kg) determined according to ISO 1133 of the polypropylene composition (C) is in the range of 10.0 to 40.0 g/10 min, more preferably in the range of 12.0 to 35.0 g/10 min, still more preferably in the range of 14.0 to 28.0 g/10 min, like in the range of 14.0 to 19.0 g/10 min.

Further, it is preferred that the polypropylene composition (C) is featured by a rather high flexural modulus determined on compact (non-foamed) injection-moulded specimen. Accordingly, it is preferred that the polypropylene composition (C) has a flexural modulus measured on injection moulded specimens according to ISO 178 in the range of 1000 to 3000 MPa, more preferably in the range of 1500 to 2800 MPa, still more preferably in the range of 2000 to 2500 MPa.

Additionally or alternatively to the previous paragraph, it is preferred that the polypropylene composition (C) has a Charpy notched impact strength on compact injection-moulded specimen determined according to ISO 179/1eA at 23° C. of at least 10.0 $kJ/m^2$, more preferably at least 12.0 $kJ/m^2$, still more preferably at least 15.0 $kg/m^2$.

Preferably, the polypropylene composition (C) has a rather low density measured on compact injection-moulded specimen. In particular, it is preferred that the polypropylene composition (C) has a density below 4.0 $g/cm^3$, more preferably below 2.0 $g/cm^3$, still more preferably below 1.5 $g/cm^3$, like below 1.1 $g/cm^3$.

Preferably the foamed injection moulded polypropylene composition (C) has a rather low density. In particular, it is preferred that the foamed polypropylene composition has a density below 2.0 $g/cm^3$, more preferably below 1.5 $g/cm^3$, still more preferably below 1.1 $g/cm^3$, like below 0.9 $g/cm^3$.

In the following, the heterophasic propylene copolymer (HECO1), the heterophasic propylene copolymer (HECO2), the high density polyethylene (HDPE), the plastomer (PL), the inorganic filler (F) and the nucleating agent (NU) are described in more detail.

The Heterophasic Propylene Copolymer (HECO1)

The inventive polypropylene composition (C) comprises a heterophasic propylene copolymer (HECO1).

The heterophasic propylene copolymer (HECO1) according to this invention comprises a matrix (M1) being the propylene polymer (PP1) and dispersed therein an elastomeric propylene copolymer being the elastomeric propylene copolymer (E1). Thus the matrix (M1) contains (finely) dispersed inclusions being not part of the matrix (M1) and said inclusions contain the elastomeric propylene copolymer (E1). The term inclusion indicates that the matrix (M1) and the inclusion form different phases within the heterophasic propylene copolymer (HECO1). The presence of second phases or the so called inclusions are for instance visible by high resolution microscopy, like electron microscopy or atomic force microscopy, or they can be detected by dynamic mechanical thermal analysis (DMTA). Specifically, in DMTA the presence of a multiphase structure can be identified by the presence of at least two distinct glass transition temperatures.

Accordingly, the heterophasic propylene copolymer (HECO1) according to this invention preferably comprises
(a) the (semi)crystalline propylene polymer (PP1) as the matrix (M1) and
(b) the elastomeric propylene copolymer (E1).

Preferably the weight ratio between the propylene polymer (PP1) and the elastomeric propylene copolymer (E1) [PP1/E1] of the heterophasic propylene copolymer (HECO1) is in the range of 90/10 to 40/60, more preferably in the range of 85/15 to 45/55, yet more preferably in the range of 83/17 to 50/50, like in the range of 75/25 to 60/40.

Preferably, the heterophasic propylene copolymer (HECO1) according to this invention comprises as polymer components only the propylene polymer (PP1) and the elastomeric propylene copolymer (E1). In other words, the heterophasic propylene copolymer (HECO1) may contain further additives but no other polymer in an amount exceeding 5.0 wt.-%, more preferably exceeding 3.0 wt.-%, like exceeding 1.0 wt.-%, based on the total heterophasic propylene copolymer (HECO1). One additional polymer which may be present in such low amounts is a polyethylene which is a reaction by-product obtained by the preparation of the heterophasic propylene copolymer (HECO1). Accordingly, it is in particular appreciated that the instant heterophasic propylene copolymer (HECO1) contains only the propylene polymer (PP1), the elastomeric propylene copolymer (E1) and optionally polyethylene in amounts as mentioned in this paragraph.

The heterophasic propylene copolymer (HECO1) applied according to this invention is featured by a rather low melt flow rate. Accordingly, the heterophasic propylene copolymer (HECO1) has a melt flow rate $MFR_2$ (230° C.) in the range of 1.0 to 20.0 g/10 min, preferably in the range of 3.0 to 15.0 g/10 min, more preferably in the range of 5.0 to 10 g/10.0 min.

Preferably, it is desired that the heterophasic propylene copolymer (HECO1) is thermo mechanically stable. Accordingly, it is appreciated that the heterophasic propylene copolymer (HECO1) has a melting temperature of at least 162° C., more preferably in the range of 163 to 167° C., still more preferably in the range of 163 to 165° C.

The heterophasic propylene copolymer (HECO1) comprises apart from propylene also comonomers. Preferably the heterophasic propylene copolymer (HECO1) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene
and
(b) ethylene and/or $C_4$ to $C_8$ α-olefins.

Thus, the heterophasic propylene copolymer (HECO1), i.e. propylene polymer (PP1) as well as the elastomeric propylene copolymer (E1), can comprise monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic propylene copolymer (HECO1) according to this invention comprises, especially consists of, monomers copolymerizable with propylene from the group consisting of ethylene, 1-butene and 1-hexene. More specifically, the heterophasic propylene copolymer (HECO1) of this invention comprises—apart from propylene—units derivable from ethylene and/or 1-butene. In a preferred embodiment, the heterophasic propylene copolymer (HECO1) according to this invention comprises units derivable from ethylene and propylene only. Still more preferably the propylene polymer (PP1) as well as the elastomeric propylene copolymer (E1) of the heterophasic propylene copolymer (HECO1) contain the same comonomers, like ethylene.

Additionally, it is appreciated that the heterophasic propylene copolymer (HECO1) preferably has a rather low total comonomer content, preferably ethylene content. Thus, it is preferred that the comonomer content of the heterophasic propylene copolymer (HECO1) is in the range from 5.0 to 30.0 mol-%, preferably in the range from 6.0 to 18.0 mol-%, more preferably in the range from 7.0 to 13.0 mol-%.

The xylene cold soluble (XCS) fraction measured according to according ISO 16152 (25° C.) of the heterophasic propylene copolymer (HECO1) is in the range of 15.0 to 40.0 wt.-%, preferably in the range from 17.0 to 35.0 wt.-%, more preferably in the range from 20.0 to 33.0 wt.-%, still more preferably in the range from 23.0 to 30.0 wt.-%.

Further it is appreciated that the xylene cold soluble (XCS) fraction of the heterophasic propylene copolymer (HECO1) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (HECO1) has an intrinsic viscosity (IV) measured according to ISO 1628/1 (at 135° C. in decalin) above 3.5 dl/g. More preferably, the heterophasic propylene copolymer (HECO1) has an intrinsic viscosity (IV) in the range of 3.5 to 9.0 dl/g, preferably in the range of 3.7 to 8.5 dl/g, more preferably in the range of 3.9 to 8.0 dl/g.

Additionally, it is preferred that the comonomer content, i.e. ethylene content, of the xylene cold soluble (XCS) fraction of the heterophasic propylene copolymer (HECO1) is below 39.0 mol-%, preferably in the range of 20.0 to 38.0 mol-%, more preferably in the range of 23.0 to 35.0 mol.-%, yet more preferably in the range of 25.0 to 29.0 mol.-%. The comonomers present in the xylene cold soluble (XCS) fraction are those defined above for the propylene polymer (M1) and the elastomeric propylene copolymer (E1), respectively. In one preferred embodiment the comonomer is ethylene only.

The heterophasic propylene copolymer (HECO1) can be further defined by its individual components, i.e. the propylene polymer (PP1) and the elastomeric propylene copolymer (E1).

The propylene polymer (PP1) can be a propylene copolymer or a propylene homopolymer, the latter being preferred.

In case the propylene polymer (PP1) is a propylene copolymer, the propylene polymer (PP1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene polymer (PP1) according to this invention comprises, especially consists of, monomers copolymerizable with propylene from the group consisting of ethylene, 1-butene and 1-hexene. More specifically the propylene polymer (PP1) of this invention comprises—apart from propylene—units derivable from ethylene and/or 1-butene. In a preferred embodiment the propylene polymer (PP1) comprises units derivable from ethylene and propylene only.

The propylene polymer (PP1) according to this invention has a melt flow rate MFR$_2$ (230° C./2.16 kg) measured according to ISO 1133 in the range of 70 to 300 g/10 min, more preferably in the range of 75 to 250 g/10 min, still more preferably in the range of 80 to 200 g/10 min.

As mentioned above the heterophasic propylene copolymer (HECO1) is featured by a low comonomer content. Accordingly, the comonomer content of the propylene polymer (PP1) is in the range of 0.0 to 5.0 mol-%, yet more preferably in the range of 0.0 to 3.0 mol-%, still more preferably in the range of 0.0 to 1.0 mol-%. It is especially preferred that the propylene polymer (PP1) is a propylene homopolymer.

The propylene polymer (PP1) preferably comprises at least two polymer fractions, like two or three polymer fractions, all of them are propylene homopolymers. Even more preferred the propylene polymer (PP1) comprises, preferably consists of, a first propylene homopolymer fraction (H-PP1a) and a second propylene homopolymer fraction (H-PP1b).

Preferably, the first propylene homopolymer fraction (H-PP1a) and the second propylene homopolymer fraction (H-PP1b) differ in melt flow rate.

Accordingly, one of the propylene homopolymer fractions (H-PP1a) and (H-PP1b) of the propylene polymer (PP1) is the low melt flow rate MFR$_2$ (230° C./2.16 kg) fraction and the other fraction is the high melt flow rate MFR$_2$ (230° C./2.16 kg) fraction, wherein further the low flow fraction and the high flow fraction fulfil in equation (I), more preferably in equation (Ia), still more preferably in equation (Ib), $$\frac{MFR(\text{high})}{MFR(\text{low})} \geq 2.0, \quad (I)$$

$$8.0 \geq \frac{MFR(\text{high})}{MFR(\text{low})} \geq 2.5, \quad (Ia)$$

$$5.0 \geq \frac{MFR(\text{high})}{MFR(\text{low})} \geq 3.5, \quad (Ib)$$

wherein MFR (high) is the melt flow rate MFR$_2$ (230° C./2.16 kg) [g/10 min] of the propylene homopolymer fraction with the higher melt flow rate MFR$_2$ (230° C./2.16 kg) and MFR (low) is the melt flow rate MFR$_2$ (230° C./2.16 kg) [g/10 min] of the propylene homopolymer fraction with the lower melt flow rate MFR$_2$ (230° C./2.16 kg).

Preferably, the first propylene copolymer fraction (H-PP1a) is the random copolymer fraction with the higher melt flow rate MFR$_2$ (230° C./2.16 kg) and the second propylene copolymer fraction (H-PP1b) is the random copolymer fraction with the lower melt flow rate MFR$_2$ (230° C./2.16 kg).

Accordingly, it is preferred that the first propylene homopolymer fraction (H-PP1a) has a melt flow rate MFR$_2$ (230° C./2.16 kg) in the range of 90 to 160 g/10 min, more preferably in the range of 100 to 150 g/10 min, still more preferably in the range of 120 to 140 g/10 min and/or that the second propylene homopolymer fraction (H-PP1b) has a melt flow rate MFR$_2$ (230° C./2.16 kg) in the range of 10 to 39 g/10 min, more preferably in the range of 17 to 32 g/10 min, still more preferably in the range of 22 to 27 g/10 min.

Further, the weight ratio between the first propylene homopolymer fraction (H-PP1a) and second propylene homopolymer fraction (H-PP1b) preferably is 20:80 to 80:20, more preferably 75:25 to 25:75, still more preferably 55:45 to 45:55.

The heterophasic propylene copolymer (HECO1) preferably comprises 60 to 95 wt.-%, more preferably 70 to 90 wt.-%, still more preferably 72 to 87 wt.-% of the propylene polymer (PP1), based on the total weight of the heterophasic propylene copolymer (HECO1).

Additionally, the heterophasic propylene copolymer (HECO1) preferably comprises 5 to 40 wt.-%, more preferably 10 to 30 wt.-%, still more preferably 13 to 28 wt.-% of the elastomeric propylene copolymer (E1), based on the total weight of the heterophasic propylene copolymer (HECO1).

Thus, it is appreciated that the heterophasic propylene copolymer (HECO1) preferably comprises, more preferably consists of, 60 to 95 wt.-%, more preferably 70 to 90 wt.-%, still more preferably 72 to 87 wt.-% of the propylene polymer (PP1) and 5 to 40 wt.-%, more preferably 10 to 30 wt.-%, still more preferably 13 to 28 wt.-% of the elastomeric propylene copolymer (E1), based on the total weight of the heterophasic propylene copolymer (HECO1).

Accordingly, a further component of the heterophasic propylene copolymer (HECO1) is the elastomeric propylene copolymer (E1) dispersed in the matrix (M1) being the propylene polymer (PP1). Concerning the comonomers used in the elastomeric propylene copolymer (E1) it is referred to the information provided for the first heterophasic propylene copolymer (HECO1). Accordingly, the elastomeric propylene copolymer (E1) comprises monomers copolymerizable with propylene, for example comonomers such as ethylene and/or C$_4$ to C$_8$ α-olefins, in particular ethylene and/or C$_4$ to C$_6$ α-olefins, e.g. 1-butene and/or 1-hexene. Preferably, the elastomeric propylene copolymer (E1) comprises, especially consists of, monomers copolymerizable with propylene from the group consisting of ethylene, 1-butene and 1-hexene. More specifically, the elastomeric propylene copolymer (E1) comprises—apart from propylene—units derivable from ethylene and/or 1-butene. Thus, in an especially preferred embodiment the elastomeric propylene copolymer (E1) comprises units derivable from ethylene and propylene only.

The comonomer content of the elastomeric propylene copolymer (E1) preferably is in the range of 15.0 to 55.0 mol-%, more preferably in the range of 20.0 to 50.0 mol-%, still more preferably in the range of 25.0 to 40.0 mol-%.

The heterophasic propylene copolymer (HECO1) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

According to a preferred embodiment of the present invention, the heterophasic propylene copolymer (HECO1) contains an α-nucleating agent.

According to this invention the alpha nucleating agent is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6-di-tert-butylphenyl) phosphate or aluminum-hydroxy-bis[2,2'-methylene-bis(4,6-di-t-butylphenyl)phosphate], and (iv) vinylcycloalkane polymer or vinylalkane polymer, and (v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

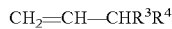

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic composition (HECO) present in the modified polypropylene composition (mPP). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

The heterophasic propylene copolymer (HECO1) can be produced by blending the propylene polymer (PP1) and the elastomeric propylene copolymer (E1). However, it is preferred that the heterophasic propylene copolymer (HECO1) is produced in a sequential step process, using reactors in serial configuration and operating at different reaction conditions. As a consequence, each fraction prepared in a specific reactor may have its own molecular weight distribution and/or comonomer content distribution.

Accordingly, it is preferred that the heterophasic propylene copolymer (HECO1) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the propylene polymer (PP1), preferably said first polypropylene fraction is a propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the propylene polymer (PP1), i.e. the matrix of the heterophasic propylene copolymer (HECO1), (d) transferring the propylene polymer (PP1) of step (c) into a third reactor (R3), (e) polymerizing in the third reactor (R3) and in the presence of the propylene polymer (PP1) obtained in step (c) propylene and ethylene to obtain the first propylene copolymer fraction of the elastomeric propylene copolymer (E1) dispersed in the propylene polymer (PP1), (f) transferring the propylene polymer (PP1) and the first propylene copolymer fraction of the elastomeric propylene copolymer (E1) into a fourth reactor (R4), (g) polymerizing in the fourth reactor (R4) and in the presence of the propylene polymer (PP1) and the first propylene copolymer fraction of the elastomeric propylene copolymer (E1) propylene and ethylene to obtain the second propylene copolymer fraction of the elastomeric propylene copolymer (E1) dispersed in the propylene polymer (PP1), the propylene polymer (PP1) and the elastomeric propylene copolymer (E1) form the heterophasic propylene copolymer (HECO1).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the heterophasic propylene copolymer (HECO1) is produced in at least two, like three or four reactors connected in series. Accordingly, the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least three, preferably three polymerization reactors, namely two slurry reactors (SR), like two loop reactors (LR), and two gas phase reactors (GPR-1) and (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO1) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

Subsequently, the reaction mixture from step (c) is transferred into the third reactor (R3), i.e. gas phase reactor (GPR-2) and, optionally, into a fourth reactor (R4), i.e. gas phase reactor (GPR-3). The conditions and residence times in reactors (R3) and/or (R4) are preferably identical with the conditions and residence times in reactor (R2) as outlined in the previous paragraphs.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO1) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO1) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

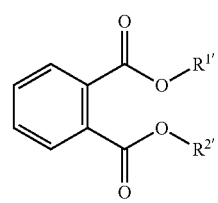

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or
d) optionally reacting the product of step c) with additional TiCl$_4$ The procatalyst is produced as defined for example in the patent applications WO 87/07620, WO 92/19653, WO 92/19658 and EP 0 491 566. The content of these documents is herein included by reference.

First an adduct of MgCl$_2$ and a C$_1$-C$_2$ alcohol of the formula MgCl$_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl and n is 1 to 6, is contacting with TiCl$_4$ to form a titanized carrier, followed by the steps of
adding to said titanised carrier
  (i) a dialkylphthalate of formula (I) with R$^{1'}$ and R$^{2'}$ being independently at least a C$_5$-alkyl, like at least a C$_8$-alkyl, or preferably
  (ii) a dialkylphthalate of formula (I) with R$^{1'}$ and R$^{2'}$ being the same and being at least a C$_5$-alkyl, like at least a C$_8$-alkyl,
  or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

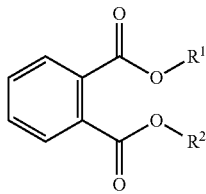

(II)

with R$^1$ and R$^2$ being methyl or ethyl, preferably ethyl, the dialkylphthalate of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminum, like triethylaluminum (TEA), dialkyl aluminum chloride and alkyl aluminum sesquichloride.

Component (iii) of the catalysts system used is an external donor represented by formula (Ma) or (Mb). Formula (IIIa) is defined by

$$Si(OCH_3)_2R_2^5 \quad (IIIa)$$

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

$$Si(OCH_2CH_3)_3(NR^xR^y) \quad (IIIb)$$

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor is of formula (IIIa), like dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$].

Most preferably the external donor is dicyclopentyl dimethoxy silane [Si(OCH$_3$)$_2$(cyclo-pentyl)$_2$] (donor D).

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

CH$_2$=CH—CHR$^3$R$^4$ wherein R$^3$ and R$^4$ together form a 5- or 6-membered saturated, unsaturated or aromatic ring or independently represent an alkyl group comprising 1 to 4 carbon atoms, and the modified catalyst is used for the preparation of the heterophasic composition (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Heterophasic Propylene Copolymer (HECO2)

According to a preferred embodiment of the present invention, the polypropylene composition (C) further comprises a heterophasic propylene copolymer (HECO2) which is different from the heterophasic propylene copolymer (HECO1).

The heterophasic propylene copolymer (HECO2) according to this invention comprises a matrix (M2) being the propylene polymer (PP2) and dispersed therein an elastomeric propylene copolymer being the elastomeric propylene copolymer (E2). Thus the matrix (M2) contains (finely) dispersed inclusions being not part of the matrix (M2) and said inclusions contain the elastomeric propylene copolymer (E2). Regarding the term "inclusions", reference is made to the definition provided above.

Accordingly, the heterophasic propylene copolymer (HECO2) according to this invention preferably comprises
(a) the (semi)crystalline propylene polymer (PP2) as the matrix (M2) and
(b) the elastomeric propylene copolymer (E2).

Preferably the weight ratio between the propylene polymer (PP2) and the elastomeric propylene copolymer (E2) [PP2/E2] of the heterophasic propylene copolymer (HECO2) is in the range of 90/10 to 40/60, more preferably in the range of 85/15 to 45/55, yet more preferably in the range of 83/17 to 50/50, like in the range of 82/18 to 60/40.

Preferably, the heterophasic propylene copolymer (HECO2) according to this invention comprises as polymer components only the propylene polymer (PP2) and the elastomeric propylene copolymer (E2). In other words, the heterophasic propylene copolymer (HECO2) may contain further additives but no other polymer in an amount exceeding 5.0 wt.-%, more preferably exceeding 3.0 wt.-%, like exceeding 1.0 wt.-%, based on the total heterophasic propylene copolymer (HECO2). One additional polymer which may be present in such low amounts is a polyethylene which is a reaction by-product obtained by the preparation of the heterophasic propylene copolymer (HECO2). Accordingly, it is in particular appreciated that the instant heterophasic propylene copolymer (HECO2) contains only the propylene polymer (PP2), the elastomeric propylene copolymer (E2) and optionally polyethylene in amounts as mentioned in this paragraph.

The heterophasic propylene copolymer (HECO2) applied according to this invention is featured by a rather high melt flow rate. Accordingly, the heterophasic propylene copolymer (HECO2) has a melt flow rate MFR$_2$ (230° C.) in the range of 50 to 120 g/10 min, preferably in the range of 60 to 110 g/10 min, more preferably in the range of 65 to 91 g/10 min.

Preferably, it is desired that the heterophasic propylene copolymer (HECO2) is thermo mechanically stable. Accordingly, it is appreciated that the heterophasic propylene copolymer (HECO2) has a melting temperature of at least 160° C., more preferably in the range of 160 to 167° C., still more preferably in the range of 162 to 165° C.

The heterophasic propylene copolymer (HECO2) comprises apart from propylene also comonomers. Preferably the heterophasic propylene copolymer (HECO2) comprises apart from propylene ethylene and/or C$_4$ to C$_8$ α-olefins. Accordingly, the term "propylene copolymer" according to this invention is understood as a polypropylene comprising, preferably consisting of, units derivable from
(a) propylene
and
(b) ethylene and/or C$_4$ to C$_8$ α-olefins.

Thus, the heterophasic propylene copolymer (HECO2), i.e. the propylene polymer (PP2) as well as the elastomeric propylene copolymer (E2), can comprise monomers copolymerizable with propylene, for example comonomers such as ethylene and/or C$_4$ to C$_8$ α-olefins, in particular ethylene and/or C$_4$ to C$_8$ α-olefins, e.g. 1-butene and/or 1-hexene. Preferably, the heterophasic propylene copolymer (HECO2) according to this invention comprises, especially consists of, monomers copolymerizable with propylene from the group consisting of ethylene, 1-butene and 1-hexene. More specifically, the heterophasic propylene copolymer (HECO2) of this invention comprises—apart from propylene—units derivable from ethylene and/or 1-butene. In a preferred embodiment, the heterophasic propylene copolymer (HECO2) according to this invention comprises units derivable from ethylene and propylene only. Still more preferably the propylene polymer (PP2) as well as the elastomeric propylene copolymer (E2) of the heterophasic propylene copolymer (HECO2) contain the same comonomers, like ethylene.

Additionally, it is appreciated that the heterophasic propylene copolymer (HECO2) preferably has a rather low total comonomer content, preferably ethylene content. Thus, it is preferred that the comonomer content of the heterophasic propylene copolymer (HECO2) is in the range from 4.0 to 30.0 mol-%, preferably in the range from 6.0 to 18.0 mol-%, more preferably in the range from 10.0 to 13.0 mol-%.

The xylene cold soluble (XCS) fraction measured according to according ISO 16152 (25° C.) of the heterophasic propylene copolymer (HECO2) is in the range of 8.0 to 35.0 wt.-%, preferably in the range from 11.0 to 30.0 wt.-%, more preferably in the range from 12.0 to 25.0 wt.-%, still more preferably in the range from 13.0 to 22.0 wt.-%.

Further it is appreciated that the xylene cold soluble (XCS) fraction of the heterophasic propylene copolymer (HECO2) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (HECO2) has an intrinsic viscosity (IV) measured according to ISO 1628/1 (at 135° C. in decalin) in the range of 1.0 to 3.3 dl/g, preferably in the range of 1.5 to 3.2 dl/g, more preferably in the range of 1.7 to 3.0 dl/g.

Additionally, it is preferred that the comonomer content, i.e. ethylene content, of the xylene cold soluble (XCS) fraction of the heterophasic propylene copolymer (HECO2) is equal or above 40 mol-%, preferably in the range of 40 to 55 mol-%, more preferably in the range of 42 to 50 mol.-%, yet more preferably in the range of 43 to 46 mol.-%. The comonomers present in the xylene cold soluble (XCS) fraction are those defined above for the propylene polymer (PP2) and the elastomeric propylene copolymer (E2), respectively. In one preferred embodiment the comonomer is ethylene only.

The heterophasic propylene copolymer (HECO2) can be further defined by its individual components, i.e. the propylene polymer (PP2) and the elastomeric propylene copolymer (E2).

The propylene polymer (PP2) can be a propylene copolymer or a propylene homopolymer, the latter being preferred.

In case the propylene polymer (PP2) is a propylene copolymer, the propylene polymer (PP2) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene polymer (PP2) according to this invention comprises, especially consists of, monomers copolymerizable with propylene from the group consisting of ethylene, 1-butene and 1-hexene. More specifically the propylene polymer (PP2) of this invention comprises—apart from propylene—units derivable from ethylene and/or 1-butene. In a preferred embodiment the propylene polymer (PP2) comprises units derivable from ethylene and propylene only.

The propylene polymer (PP2) according to this invention has a melt flow rate $MFR_2$ (230° C./2.16 kg) measured according to ISO 1133 in the range of 120 to 500 g/10 min, more preferably in the range of 130 to 200 g/10 min, still more preferably in the range of 140 to 170 g/10 min.

As mentioned above the heterophasic propylene copolymer (HECO2) is featured by a low comonomer content. Accordingly, the comonomer content of the propylene polymer (PP2) is in the range of 0.0 to 5.0 mol-%, yet more preferably in the range of 0.0 to 3.0 mol-%, still more preferably in the range of 0.0 to 1.0 mol-%. It is especially preferred that the propylene polymer (PP2) is a propylene homopolymer.

The heterophasic propylene copolymer (HECO2) preferably comprises 60 to 95 wt.-%, more preferably 60 to 90 wt.-%, still more preferably 65 to 87 wt.-% of the propylene polymer (PP2), based on the total weight of the heterophasic propylene copolymer (HECO2).

Additionally, the heterophasic propylene copolymer (HECO2) preferably comprises 5 to 40 wt.-%, more preferably 10 to 40 wt.-%, still more preferably 13 to 35 wt.-% of the elastomeric propylene copolymer (E2), based on the total weight of the heterophasic propylene copolymer (HECO2).

Thus, it is appreciated that the heterophasic propylene copolymer (HECO2) preferably comprises, more preferably consists of, 60 to 95 wt.-%, preferably 60 to 90 wt.-%, more preferably 65.0 to 87.0 wt.-% of the propylene polymer (PP2) and 5 to 40 wt.-%, preferably 10 to 40 wt.-%, more preferably 13.0 to 35.0 wt.-% of the elastomeric propylene copolymer (E2), based on the total weight of the heterophasic propylene copolymer (HECO2).

Accordingly, a further component of the heterophasic propylene copolymer (HECO2) is the elastomeric propylene copolymer (E2) dispersed in the matrix (M2) being the propylene polymer (PP2). Concerning the comonomers used in the elastomeric propylene copolymer (E2) it is referred to the information provided for the heterophasic propylene copolymer (HECO2). Accordingly, the elastomeric propylene copolymer (E2) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (E2) comprises, especially consists of, monomers copolymerizable with propylene from the group consisting of ethylene, 1-butene and 1-hexene. More specifically, the elastomeric propylene copolymer (E2) comprises—apart from propylene—units derivable from ethylene and/or 1-butene. Thus, in an especially preferred embodiment the elastomeric propylene copolymer (E2) comprises units derivable from ethylene and propylene only.

The comonomer content of the elastomeric propylene copolymer (E2) preferably is in the range of 35.0 to 70.0 mol-%, more preferably in the range of 37.0 to 60.0 mol-%, still more preferably in the range of 40.0 to 50.0 mol-%.

The heterophasic propylene copolymer (HECO2) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

According to a preferred embodiment of the present invention, the heterophasic propylene copolymer (HECO2) contains an α-nucleating agent.

According to this invention the alpha nucleating agent is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6-di-tert-butylphenyl) phosphate or aluminum-hydroxy-bis[2,2'-methylene-bis(4,6-di-t-butylphenyl)phosphate], and
(iv) vinylcycloalkane polymer or vinylalkane polymer, and
(v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic composition (HECO) present in the modified polypropylene composition (mPP). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

The heterophasic propylene copolymer (HECO2) can be produced by blending the propylene polymer (PP2) and the elastomeric propylene copolymer (E2). However, it is preferred that the heterophasic propylene copolymer (HECO2) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO2) according to this invention is preferably produced in a sequential polymerization process, i.e. in a multistage process, known in the art, wherein the propylene polymer (PP2) is produced at least in one slurry reactor, preferably in a slurry reactor and optionally in a subsequent gas phase reactor, and subsequently the elastomeric propylene copolymer (E2) is produced at least in one, i.e. one or two, gas phase reactor(s).

Accordingly it is preferred that the heterophasic propylene copolymer (HECO2) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the propylene polymer (PP2), preferably said first polypropylene fraction is a propylene homopolymer, (b) optionally transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the propylene polymer (PP2), i.e. the matrix of the heterophasic propylene copolymer (HECO2), (d) transferring the propylene polymer (PP2) of step (c) into a third reactor (R3), (e) polymerizing in the third reactor (R3) and in the presence of the propylene polymer (PP2) obtained in step (c) propylene and ethylene to obtain the elastomeric propylene copolymer (E2) dispersed in the propylene polymer (PP2), the propylene polymer (PP2) and the elastomeric propylene copolymer (E2) form the heterophasic propylene copolymer (HECO2).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the heterophasic propylene copolymer (HECO2) is produced in at least two, like three or four reactors connected in series. Accordingly, the present process comprises at least a first reactor (R1) and a second reactor (R2), more preferably a first reactor (R1), a second reactor (R2), and a third reactor (R3). Regarding the term "polymerization reactor", reference is made to the definition provided above.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactors (GPR). Accordingly for the instant process at least three, preferably three polymerization reactors, namely two slurry reactors (SR), like two loop reactors (LR), and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO2) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2) is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO2) is obtained by a multistage polymerization process, as described above, in the presence of a catalyst system comprising as component (i) a Ziegler-Natta procatalyst which contains a trans-esterification product of a lower alcohol and a phthalic ester.

Regarding the preferred catalyst system, reference is made to the catalyst defined above with regard to the heterophasic propylene copolymer (HECO1).

According to another preferred embodiment, the Ziegler-Natta catalyst for the preparation of the heterophasic propylene copolymer (HECO2) comprises a high-yield Ziegler-Natta type catalyst including an internal donor component, which can be used at high polymerization temperatures of 80° C. or more. Such high-yield Ziegler-Natta catalyst can comprise a succinate, a diether, a phthalate etc., or mixtures therefrom as internal donor (ID) and are for example commercially available from LyondellBasell under the Avant ZN trade name. Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll. A further example of the Avant ZN series is the catalyst ZN180M of LyondellBasell.

In a further embodiment, the Ziegler-Natta procatalyst for the production of the second heterophasic propylene copolymer (HECO2) can also be modified by polymerizing a vinyl compound in the presence of the catalyst system as described above.

The Plastomer (PL)

According to a preferred embodiment of the present invention, the polypropylene composition (C) further comprises a plastomer (PL) being a copolymer of ethylene and a $C_4$ to $C_8$ α-olefin.

The plastomer (PL) can be any elastomeric polyolefin with the proviso that it chemically differs from the elastomeric propylene copolymers (E1) and (E2) as defined herein. More preferably the plastomer (PL) is a very low density polyolefin, still more preferably a very low density polyolefin polymerized using single site catalysis, preferably metallocene catalysis. Typically, the plastomer (PL) is an ethylene copolymer.

The plastomer (PL) has a density below 0.900 g/cm³. More preferably, the density of the plastomer (PL) is equal or below 0.890 g/cm³, still more preferably in the range of 0.845 to 0.890 g/cm³.

Preferably, the plastomer (PL) has a melt flow rate $MFR_2$ (190° C., 2.16 kg) of less than 50 g/10 min, more preferably from 10.0 to 40 g/10 min, still more preferably from 15.0 to 35 g/10 min, like a range from 25.0 to 33.0 g/10 min.

Preferably, the plastomer (PL) comprises units derived from ethylene and a $C_4$ to $C_{20}$ α-olefin.

The plastomer (PL) comprises, preferably consists of, units derivable from (i) ethylene and (ii) at least another $C_4$ to $C_{20}$ α-olefin, like $C_4$ to $C_{10}$ α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene. It is especially preferred that the plastomer (PL) is a copolymer of ethylene and 1-octene.

In an especially preferred embodiment, the plastomer (PL) consists of units derivable from ethylene and 1-octene.

The comonomer content, like the $C_4$ to $C_{20}$ α-olefin content, of the plastomer (PL) is in the range of 3.0 to 25.0 mol-%, more preferably in the range of 4.0 to 20.0 mol-%, still more preferably in the range of 5.0 to 15.0 mol-%, like in the range of 6.0 to 10.0 mol-%.

In one preferred embodiment the plastomer (PL) is prepared with at least one metallocene catalyst. The plastomer (PL) may also be prepared with more than one metallocene catalyst or may be a blend of multiple elastomers prepared with different metallocene catalysts. In some embodiments, the plastomer (PL) is a substantially linear ethylene polymer (SLEP). SLEPs and other metallocene catalysed plastomers (PL) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

The High Density Polyethylene (HDPE)

According to a preferred embodiment of the present invention, the polypropylene composition (C) further comprises a high density polyethylene (HDPE).

The expression "high density polyethylene" used in the instant invention relates to a polyethylene obtained in the presence of a Ziegler-Natta or metallocene catalyst that consists substantially, i.e. of more than 99.70 mol-%, still more preferably of at least 99.80 mol-%, of ethylene units. In a preferred embodiment only ethylene units in the high density polyethylene (HDPE) are detectable.

The high density polyethylene (HDPE) has a density of at least 0.800 g/cm$^3$. More preferably, the high density polyethylene (HDPE) has a density in the range of 0.830 to 0.970 g/cm$^3$, still more preferably in the range of 0.900 to 0.965 g/cm$^3$, like in the range of 0.940 to 0.960 g/cm$^3$.

It is especially preferred that the high density polyethylene (HDPE) has a weight average molecular weight Mw in the range of 60 to 85 kg/mol, preferably in the range of 65 to 85 kg/mol, still more preferably in the range of 70 to 80 kg/mol.

Further it is preferred that the high density polyethylene (HDPE) has a rather broad molecular weight distribution (Mw/Mn). Accordingly, it is preferred that the molecular weight distribution (Mw/Mn) of the high density polyethylene (HDPE) is in the range of 6.0 to 8.0, more preferably in the range of 6.5 to 7.5, like in the range of 6.5 to 7.0.

Additionally, it is preferred that the high density polyethylene (HDPE) has a rather low melt flow rate. Accordingly, the melt flow rate MFR (190° C., 2.16 kg) measured according to ISO 1133 of the high density polyethylene (HDPE) is preferably in the range of 0.1 to 15.0 g/10 min, more preferably in the range of 1.0 to 10.0 g/10 min, still more preferably in the range of 2.0 to 4.0 g/10 min at 190° C.

Preferably, the high density polyethylene (HDPE) according to the present invention is a high density polyethylene known in the art. In particular, it is preferred that the high density polyethylene (HDPE) is the commercial ethylene homopolymer MB7541 of Borealis AG.

The Nucleating Agent (NU)

The polypropylene composition (C) according to the present invention further comprises a nucleating agent (NU) being a dicarboxylic acid and/or a salt thereof.

Accordingly, said nucleating agent (NU) is preferably an aliphatic or aromatic compound comprising two carboxylic acid functionalities as free acids or partially or fully neutralized with alkali or earth alkali metal cations. In particular, the carboxylic acid functionalities of the nucleating agent (NU) according to the present invention can be free acids or partially or fully neutralized with cations of sodium, lithium, potassium, calcium, barium, magnesium, strontium or mixtures thereof. Preferably, all cations are earth alkali metal cations. It is especially preferred that the earth alkali metal cation is calcium.

Preferably, said nucleating agent (NU) is an aliphatic compound comprising two carboxylic acid functionalities as free acids or partially or fully neutralized with alkali or earth alkali metal cations. In particular, the nucleating agent (NU) can be a linear or cyclic aliphatic compound. Accordingly, the nucleating agent (NU) is selected from the group consisting of oxalic acid, malonic acid, succinic acid, malic acid, citric acid, 1,2-cyclohexane dicarboxylic acid, 1,3-cyclohexane dicarboxylic acid, 1,4-cyclohexane dicarboxylic acid, 1,1-cyclobutane dicarboxylic acid, 1,2-cyclopentane dicarboxylic acid and, or salts thereof.

It is especially preferred that the nucleating agent (NU) is a cyclic aliphatic compound comprising two acid functionalities as free acids or partially or fully neutralized with alkali or earth alkali metal cations. Accordingly, the nucleating agent (NU) is selected from the group consisting of 1,2-cyclohexane dicarboxylic acid, 1,3-cyclohexane dicarboxylic acid, 1,4-cyclohexane dicarboxylic acid, 1,1-cyclobutane dicarboxylic acid, 1,2-cyclopentane dicarboxylic acid and/or salts thereof.

It is especially preferred that the nucleating agent (NU) is 1,2-cyclohexane dicarboxylic acid. In particular, it is preferred that the nucleating agent (NU) is a composition comprising 1,2-cyclohexane dicarboxylic acid and the Ca-salt thereof.

The present invention is further directed to the use of a nucleating agent (NU) being a dicarboxylic acid and/or a salt thereof to reduce tigerskin of a polypropylene composition (C) as described above.

According to this invention nucleating agent (NU) does not belong to the class of fillers (F) and additives (AD).

The Inorganic Filler (F)

A further requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc.

The most preferred inorganic fillers (F) are talc and/or wollastonite. It is especially preferred that the inorganic filler (F) is talc.

It is appreciated that the filler (F) has median particle size ($D_{50}$) in the range of 0.8 to 20 μm and a top cut particle size ($D_{95}$) in the range of 10 to 20 μm, preferably a median particle size ($D_{50}$) in the range of 5.0 to 8.0 μm and top cut particle size ($D_{95}$) in the range of 12 to 17 μm, more preferably a median particle size ($D_{50}$) in the range of 5.5 to 7.8 μm and top cut particle size ($D_{95}$) of 13 to 16.5 μm.

According to this invention the filler (F) does not belong to the class of alpha nucleating agents and additives (AD).

The filler (F) is state of the art and a commercially available product.

Additives (AD)

In addition the heterophasic propylene copolymer (HECO1), the heterophasic propylene copolymer (HECO2), the inorganic filler (F), optionally the plastomer (PL) and optionally the high density polyethylene (HDPE), the composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above, the nucleating agent (NU) and the inorganic filler (F) are not regarded as additives (AD).

Such additives are commercially available and for example described in "Plastic Additives Handbook", $6^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the composition (C) of the invention does not comprise (a) further polymer (s) different to the heterophasic propylene copolymers (HECO1) and (HECO2), the plastomer (PL) and the high density polyethylene (HDPE), in an amount exceeding 15 wt.-%, preferably in an amount exceeding 10 wt.-%, more preferably in an amount exceeding 9 wt.-%, based on the weight of the composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition of the present invention is preferably used for the production of articles, more preferably of foamed articles. Even more preferred is the use for the production of automotive articles, especially of car interiors and exteriors, like bumpers, side trims, step assists, body panels, spoilers, dashboards, interior trims and the like.

The current invention also provides articles, more preferably foamed articles, comprising, preferably comprising at least 60 wt.-%, more preferably at least 80 wt.-%, yet more preferably at least 95 wt.-%, like consisting of, the inventive composition. Accordingly, the present invention is especially directed to parts of automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition.

The Use

The present invention is also directed to the use of the inventive composition for the production of a foamed article as described in the previous paragraphs.

The present invention will now be described in further detail by the examples provided below.

EXAMPLES

1. Measuring Methods

The following definitions of terms and determination methods apply for the above general description of the invention as well as to the below examples unless otherwise defined.

Calculation of comonomer content of the first elastomeric propylene copolymer fraction, i.e. the polymer fraction produced in the third reactor (R3), of the heterophasic propylene copolymer (HECO1):

$$\frac{C(PP) - w(PP12) \times C(PP12)}{w(PP3)} = C(PP3)$$

wherein
w(PP12) is the weight fraction [in wt.-%] of the first and second propylene polymer fractions, i.e. the polymer produced in the first and second reactor (R1+R2),
w(PP3) is the weight fraction [in wt.-%] of the first elastomeric propylene copolymer fraction, i.e. the polymer produced in the third reactor (R3),
C(PP12) is the comonomer content [in mol-%] of the first and second propylene polymer fractions, i.e. the polymer produced in the first and second reactor (R1+R2),
C(PP) is the comonomer content [in mol-%] of the first and second propylene polymer fractions and the first elastomeric propylene copolymer fraction, i.e. the polymer produced in the first, second and third reactor (R1+R2+R3),
C(PP2) is the calculated comonomer content [in mol-%] of the first elastomeric propylene copolymer fraction, i.e. the polymer produced in the third reactor (R3).

Calculation of comonomer content of the second elastomeric propylene copolymer fraction, i.e. the polymer fraction produced in the fourth reactor (R3), of the heterophasic propylene copolymer (HECO1):

$$\frac{C(PP) - w(PP123) \times C(PP123)}{w(PP4)} = C(PP4)$$

wherein
w(PP123) is the weight fraction [in wt.-%] of the first and second propylene polymer fractions and the first elastomeric propylene copolymer fraction, i.e. the polymer produced in the first, second and third reactor (R1+R2+R3),
w(PP4) is the weight fraction [in wt.-%] of second elastomeric propylene copolymer fraction, i.e. the polymer produced in the fourth reactor (R4),
C(PP123) is the comonomer content [in mol-%] of the first and second propylene polymer fractions and the first elastomeric propylene copolymer fraction, i.e. the polymer produced in the first, second and third reactor (R1+R2+R3),
C(PP) is the comonomer content [in mol-%] of the first and second propylene polymer fractions and the first and second elastomeric propylene copolymer fractions, i.e. the polymer produced in the first, second, third and fourth reactor (R1+R2+R3),
C(PP4) is the calculated comonomer content [in mol-%] of the second elastomeric propylene copolymer fraction, i.e. the polymer produced in the fourth reactor (R4).

Calculation of the xylene cold soluble (XCS) content of the elastomeric propylene copolymer fraction, i.e. the polymer fraction produced in the third and fourth reactor (R3+R4), of the heterophasic propylene copolymer (HECO1):

$$\frac{XS(HECO) - w(PP12) \times XS(PP12)}{w(E)} = XS(E)$$

wherein w(PP12) is the weight fraction [in wt.-%] of the first and second propylene polymer fractions, i.e. the polymer produced in the first and second reactor (R1+R2), w(E) is the weight fraction [in wt.-%] of the elastomeric propylene copolymer fraction, i.e. the polymer produced in the third and fourth reactor (R3+R4)

XS(PP12) is the xylene cold soluble (XCS) content [in wt.-%] of the first and second propylene polymer fractions, i.e. the polymer produced in the first and second reactor (R1+R2), XS(HECO) is the xylene cold soluble (XCS) content [in wt.-%] of the first and second propylene polymer fractions and the elastomeric propylene copolymer fraction, i.e. polymer produced in the first, second, third and fourth (R1+R2+R3+R4), XS(E) is the calculated xylene cold soluble (XCS) content [in wt.-%] of the elastomeric propylene copolymer fraction, i.e. the polymer produced in the third and fourth reactor (R3+R4).

Calculation of the xylene cold soluble (XCS) content of the first elastomeric propylene copolymer fraction, i.e. the polymer fraction produced in the third reactor (R3), of the heterophasic propylene copolymer (HECO1):

$$\frac{XS(PP) - w(PP12) \times XS(PP12)}{w(PP3)} = XS(PP3)$$

wherein w(PP12) is the weight fraction [in wt.-%] of the first and second propylene polymer fractions, i.e. the polymer produced in the first and second reactor (R1+R2), w(PP3) is the weight fraction [in wt.-%] of the first elastomeric propylene copolymer fraction, i.e. the polymer produced in the third reactor (R3)

XS(PP12) is the xylene cold soluble (XCS) content [in wt.-%] of the first and second elastomeric propylene polymer fractions, i.e. the polymer produced in the first and second reactor (R1+R2), XS(PP) is the xylene cold soluble (XCS) content [in wt.-%] of the first and second propylene polymer fraction and the first elastomeric propylene copolymer fraction, i.e. polymer produced in the first, second and third reactor (R1+R2+R3), XS(PP3) is the calculated xylene cold soluble (XCS) content [in wt.-%] of the first elastomeric propylene copolymer fraction, i.e. the polymer produced in the third reactor (R3).

Calculation of the xylene cold soluble (XCS) content of the second elastomeric propylene copolymer fraction, i.e. the polymer fraction produced in the fourth reactor (R4):

$$\frac{XS(PP) - w(PP123) \times XS(PP123)}{w(PP4)} = XS(PP4)$$

wherein w(PP123) is the weight fraction [in wt.-%] of the first and second propylene polymer fractions and the first elastomeric propylene copolymer fraction, i.e. the polymer produced in the first, second and third reactor (R1+R2+R3), w(PP4) is the weight fraction [in wt.-%] of the second propylene copolymer fraction, i.e. the polymer produced in the fourth reactor (R4)

XS(PP123) is the xylene cold soluble (XCS) content [in wt.-%] of the first and second propylene polymer fractions and the first elastomeric propylene copolymer fraction, i.e. the polymer produced in the first, second and third reactor (R1+R2+R3), XS(PP) is the xylene cold soluble (XCS) content [in wt.-%] of the first and second propylene polymer fractions and the first and second elastomeric propylene copolymer fractions, i.e. polymer produced in the first, second reactor and third reactor (R1+R2+R3+R4), XS(PP4) is the calculated xylene cold soluble (XCS) content [in wt.-%] of the second elastomeric propylene copolymer fraction, i.e. the polymer produced in the fourth reactor (R4).

Calculation of melt flow rate $MFR_2$ (230° C.) of the second propylene polymer fraction, i.e. the polymer fraction produced in the second reactor (R2), of the heterophasic propylene copolymer (HECO1):

$$MFR(PP2) = 10^{\left[\frac{log(MFR(PP)) - w(PP1) \times log(MFR(PP1))}{w(PP2)}\right]}$$

wherein w(PP1) is the weight fraction [in wt.-%] of the first propylene polymer fraction, i.e. the polymer produced in the first reactor (R1), w(PP2) is the weight fraction [in wt.-%] of the first second propylene polymer fraction, i.e. the polymer produced in the second reactor (R2), MFR(PP1) is the melt flow rate $MFR_2$ (230° C.) [in g/10 min] of the first propylene polymer fraction, i.e. the polymer produced in the first reactor (R1), MFR(PP) is the melt flow rate $MFR_2$ (230° C.) [in g/10 min] of the first and second propylene polymer fractions, i.e. the polymer produced in the first and second reactor (R1+R2), MFR(PP2) is the calculated melt flow rate $MFR_2$ (230° C.) [in g/10 min] of the first propylene polymer fraction, i.e. the polymer produced in the second reactor (R2).

Calculation of the intrinsic viscosity of the xylene soluble fraction of the first elastomeric propylene copolymer fraction, i.e. the polymer fraction produced in the third reactor (R3), of the heterophasic propylene copolymer (HECO1):

$$\frac{IV(PP) - XCS(PP12) \times IV(PP12)}{XCS(PP3)} = IV(PP3)$$

wherein

XCS(PP12) is the xylene soluble fraction [in wt.-%] of the first and second propylene polymer fractions, i.e. the polymer produced in the first and second reactor (R1+R2), XCS(PP3) is the xylene soluble fraction [in wt.-%] of the first elastomeric propylene copolymer fraction, i.e. the polymer produced in the third reactor (R3), IV(PP12) is the intrinsic viscosity [in dl/g] of the xylene soluble fraction of the first and second propylene polymer fractions, i.e. the polymer produced in the first and second reactor (R1+R2), IV(PP) is the intrinsic viscosity [in dl/g] of the xylene soluble fraction of the first and second propylene polymer fractions and the first elastomeric propylene copolymer fraction, i.e. polymer produced in the first, second and third reactor (R1+R2+R3), IV(PP3) is the calculated intrinsic viscosity [in dl/g] of the xylene soluble fraction of the first elastomeric propylene copolymer fraction, i.e. the polymer produced in the third reactor (R3).

Calculation of the intrinsic viscosity of the xylene soluble fraction of the second elastomeric propylene copolymer fraction, i.e. the polymer fraction produced in the fourth reactor (R4), of the heterophasic propylene copolymer (HECO1):

$$\frac{IV(PP) - XCS(PP123) \times IV(PP123)}{XCS(PP4)} = IV(PP4)$$

wherein
XCS(PP123) is the xylene soluble fraction [in wt.-%] of the first and second propylene polymer fractions and the first elastomeric propylene copolymer fraction, i.e. the polymer produced in the first, second and third reactor (R1+R2+R3),
XCS(PP4) is the xylene soluble fraction [in wt.-%] of second elastomeric propylene copolymer fraction, i.e. the polymer produced in the fourth reactor (R4),
IV(PP123) is the intrinsic viscosity [in dl/g] of the xylene soluble fraction of the first and second propylene polymer fractions and the first elastomeric propylene copolymer fraction, i.e. the polymer produced in the first, second and third reactor (R1+R2+R3),
IV(PP) is the intrinsic viscosity [in dl/g] of the xylene soluble fraction of the first and second propylene polymer fractions and the first and second elastomeric propylene copolymer fractions, i.e. polymer produced in the first, second, third and fourth reactor (R1+R2+R3+R4),
IV(PP4) is the calculated intrinsic viscosity [in dl/g] of the xylene soluble fraction of the second elastomeric propylene copolymer fraction, i.e. the polymer produced in the fourth reactor (R4).

Calculation of comonomer content of the elastomeric propylene copolymer fraction, i.e. the polymer fraction produced in the third and fourth reactor (R3+R4), of the heterophasic propylene copolymer (HECO1):

$$\frac{C(HECO) - w(PP12) \times C(PP12)}{w(E)} = C(E)$$

wherein
w(PP12) is the weight fraction [in wt.-%] of the first and second propylene polymer fractions, i.e. the polymer produced in the first and second reactor (R1+R2),
w(E) is the weight fraction [in wt.-%] of the elastomeric propylene copolymer fraction, i.e. the polymer produced in the third and fourth reactor (R3+R4)
C(PP12) is the comonomer content [in mol-%] of the first and second propylene polymer fractions, i.e. the polymer produced in the first and second reactor (R1+R2),
C(HECO) is the comonomer content [in mol-%] of the first and second propylene polymer fractions and the elastomeric propylene copolymer, i.e. polymer produced in the first, second, third and fourth (R1+R2+R3+R4),
C(E) is the calculated comonomer content [in mol-%] of the elastomeric propylene copolymer fraction, i.e. the polymer produced in the third and fourth reactor (R3+R4).

Calculation of comonomer content of the elastomeric copolymer fraction, i.e. the polymer fraction produced in the third reactor (R3), of the heterophasic propylene copolymer (HECO2):

$$\frac{C(PP) - w(PP12) \times C(PP12)}{w(PP3)} = C(PP3)$$

wherein
w(PP12) is the weight fraction [in wt.-%] of the first and second propylene polymer fraction, i.e. the polymer produced in the first and second reactor (R1+R2),
w(PP3) is the weight fraction [in wt.-%] of the elastomeric propylene copolymer fraction, i.e. the polymer produced in the third reactor (R3),
C(PP12) is the comonomer content [in mol-%] of the first and second propylene polymer fraction, i.e. the polymer produced in the first and second reactor (R1+R2),
C(PP) is the comonomer content [in mol-%] of the first propylene polymer fraction, the second propylene polymer fraction and the elastomeric propylene copolymer fraction, i.e. polymer produced in the first, second and third reactor (R1+R2+R3),
C(PP3) is the calculated comonomer content [in mol-%] of the elastomeric propylene copolymer fraction, i.e. the polymer produced in the third reactor (R3).

Calculation of the xylene cold soluble (XCS) content of the elastomeric propylene copolymer fraction, i.e. the polymer fraction produced in the third reactor (R3), of the heterophasic propylene copolymer (HECO2):

$$\frac{XS(HECO) - w(PP12) \times XS(PP12)}{w(E)} = XS(E)$$

wherein
w(PP12) is the weight fraction [in wt.-%] of the first and second propylene polymer fraction, i.e. the polymer produced in the first and second reactor (R1+R2),
w(E) is the weight fraction [in wt.-%] of the elastomeric propylene copolymer fraction, i.e. the polymer produced in the third reactor (R3)
XS(PP12) is the xylene cold soluble (XCS) content [in wt.-%] of the first and second propylene polymer fraction, i.e. the polymer produced in the first and second reactor (R1+R2),
XS(HECO) is the xylene cold soluble (XCS) content [in wt.-%] of the first propylene polymer fraction, the second propylene polymer fraction and the elastomeric propylene copolymer fraction, i.e. polymer produced in the first, second reactor and third reactor (R1+R2+R3),
XS(E) is the calculated xylene cold soluble (XCS) content [in wt.-%] of the elastomeric propylene copolymer fraction, i.e. the polymer produced in the second and third reactor (R2+3).

Calculation of melt flow rate $MFR_2$ (230° C.) of the elastomeric propylene copolymer fraction, i.e. the polymer fraction produced in the third reactor (R3), of the heterophasic propylene copolymer (HECO2):

$$MFR(PP3) = 10^{\left[\frac{\log(MFR(PP)) - w(PP12) \times \log(MFR(PP12))}{w(PP3)}\right]}$$

wherein
w(PP12) is the weight fraction [in wt.-%] of the first and second propylene polymer fractions, i.e. the polymer produced in the first and second reactor (R1+R2), w(PP3) is the weight fraction [in wt.-%] of the elastomeric propylene copolymer fraction, i.e. the polymer produced in the third reactor (R3), MFR(PP12) is the melt flow rate $MFR_2$ (230° C.) [in g/10 min] of the first and second propylene fractions, i.e. the polymer produced in the first and second reactor (R1+R2), MFR(PP) is the melt flow rate $MFR_2$ (230° C.) [in g/10 min] of the first and second propylene polymer fractions and the elastomeric propylene copolymer fraction, i.e. the polymer produced in the first, second and third reactor (R1+R2+R3), MFR(PP3) is the calculated melt flow rate $MFR_2$ (230° C.) [in g/10 min] of the elastomeric propylene copolymer fraction, i.e. the polymer produced in the third reactor (R3).

Calculation of comonomer content of the elastomeric propylene copolymer fraction, i.e. the polymer fraction produced in the third reactor (R3), of the heterophasic propylene copolymer (HECO2):

$$\frac{C(HECO) - w(PP) \times C(PP)}{w(E)} = C(E)$$

wherein w(PP) is the weight fraction [in wt.-%] of the first and second propylene polymer fractions, i.e. the polymer produced in the first and second reactor (R1+R2), w(E) is the weight fraction [in wt.-%] of the elastomeric propylene copolymer, i.e. of the polymer produced in the third reactor (R3), C(PP) is the comonomer content [in mol-%] of the first and second propylene polymer fractions, i.e. the polymer produced in the first and second reactor (R1+R2), C(HECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of the elastomeric propylene copolymer fraction, i.e. of the polymer produced in the third reactor (R3).

$MFR_2$ (230° C.) is measured according to ISO 1133 (230° C., 2.16 kg load).

$MFR_2$ (190° C.) is measured according to ISO 1133 (190° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100 * (mmmm/\text{sum of all pentads})$$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e} = (I_6 + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

$$[21e]\text{mol }\% = 100 * (P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol \%]=100*fE$$

The weight percent comonomer incorporation was calculated from the mole fraction:

$$E[wt \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Quantification of Comonomer Content of the Plastomer (PL) by NMR Spectroscopy

Quantitative nuclear-magnetic resonance (NMR) spectroscopy was used to quantify the comonomer content of the polymers.

Quantitative $^{13}C$ $\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382.; Parkinson, M., Klimke, K., Spiess, H. W., Wilhelm, M., Macromol. Chem. Phys. 2007; 208:2128.; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813.; Klimke, K., Parkinson, M., Piel, C., Kaminsky, W., Spiess, H. W., Wilhelm, M., Macromol. Chem. Phys. 2006; 207:382) and the RS-HEPT decoupling scheme (Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 2007 45, S1, S198). A total of 1024 (1 k) transients were acquired per spectrum. This setup was chosen due its high sensitivity towards low comonomer contents.

Quantitative $^{13}C$ $\{^1H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201).

Poly(Ethyelene-Co-Octene)—Octene Content

Characteristic signals corresponding to the incorporation of 1-octene were observed (J. Randall, Macromol. Sci., Rev. Macromol. Chem. Phys. 1989, C29, 201; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both *B6 and *βB6B6 sites of isolated (EEOEE) and isolated double non-consecutive (EEOEOEE) 1-octene sequences respectively. To compensate for the influence of the two *βB6B6 sites the integral of the ββB6B6 site at 24.7 ppm is used:

$$O=I_{*B6+*\beta B6B6}-2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the ααB6B6 sites accounting for the number of reporting sites per comonomer:

$$OO=2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO=2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO=3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total}=O+OO+OEO+OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S=(\frac{1}{2})*(I_{2S+2B6}+I_{3S+3B6}-2*O_{total})$$

The ethylene comonomer content was quantified using the integral of the bulk methylene (bulk) signals at 30.00 ppm. This integral included the γ and 4B6 sites from 1-octene as well as the δ$^+$ sites. The total ethylene comonomer content was calculated based on the bulk integral and compensating for the observed 1-octene sequences and end-groups:

$$E_{total}=(\frac{1}{2})*[I_{bulk}+2*O+1*OO+3*OEO+0*OOO+3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO=(O_{total}/(E_{total}+O_{total}))$$

The total comonomer incorporation of 1-octene in mol percent was calculated from the mole fraction in the standard manner:

$$O[mol\%]=100*fO$$

The mole percent ethyelene incorporation was calculated from the formula:

$$E[mol\%]=100-O[mol\%].$$

Poly(Ethyelene-Co-Butene)—Butene Content

Characteristic signals corresponding to the incorporation of 1-butene were observed (J. Randall, Macromol. Sci., Rev. Macromol. Chem. Phys. 1989, C29, 201) and all comonomer contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.9 ppm assigned to the *B2 sites, accounting for the number of reporting sites per comonomer:

$$B=I_{*B2}$$

Characteristic signals resulting from double consecutive 1-butene incorporation i.e. EEBBEE comonomer sequences were observed. Consecutive double 1-butene incorporation was quantified using the integral of the signal at 39.4 ppm assigned to the ααB2B2 sites accounting for number of reporting sites per comonomer:

$$BB=2*I_{\alpha\alpha B2B2}$$

Characteristic signals resulting from non consecutive 1-butene incorporation i.e. EEBEBEE comonomer sequences were also observed. Non-consecutive 1-butene incorporation was quantified using the integral of the signal at 24.7 ppm assigned to the ββB2B2 sites accounting for the number of reporting sites per comonomer:

$$BEB=2*I_{\beta\beta B2B2}$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B=I_{*B2}-2*I_{\beta\beta B2B2}$$

Characteristic signals resulting from triple consecutive 1-butene incorporation i.e. EEBBBEE comonomer sequences were observed. Consecutive triple 1-butene incorporation was quantified using the integral of the signal at 40.4 ppm assigned to the ααγB2B2B2 sites accounting for the number of reporting sites per comonomer:

$$BBB=3*I_{\alpha\alpha\gamma B2B2B2}$$

With no other signals indicative of other comonomer sequences, i.e. butene chain initiation, observed the total 1-butene comonomer content was calculated based solely on the amount of isolated (EEBEE), double consecutive (EEBBEE), non-consecutive (EEBEBEE) and triple consecutive (EEBBBEE) 1-butene comonomer sequences:

$$B_{total}=B+BB+BEB+BBB$$

Characteristic signals resulting from saturated end-groups were observed. The content of such saturated end-groups was quantified using the average of the integral of the signals at 22.84 and 32.23 ppm assigned to the 2 s and 3 s sites respectively:

$$S=(\frac{1}{2})*(I_{2S}+I_{3S})$$

The relative content of ethylene was quantified using the integral of the bulk methylene (δ+) signals at 30.00 ppm:

$$E=(\frac{1}{2})*I_{\delta+}$$

The total ethylene comonomer content was calculated based the bulk methylene signals and accounting for ethylene units present in other observed comonomer sequences or end-groups:

$$E_{total}=E+(5/2)*B+(7/2)*BB+(9/2)*BEB+(9/2)*BBB+(3/2)*S$$

The total mole fraction of 1-butene in the polymer was then calculated as:

$$fB=(B_{total}/(E_{total}+B_{total}))$$

The total comonomer incorporation of 1-butene in mole percent was calculated from the mole fraction in the usual manner:

$$B[mol\%]=100*fB$$

The mole percent ethyelene incorporation was calculated from the formula:

$$E[mol\%]=100-B[mol\%].$$

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 µL. of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Melting Temperature and Degree of Crystallinity

DSC analysis: melting temperature (Tm), crystallization temperature (Tc): measured with a TA Instrument Q2000 differential scanning calorimeter (DSC) on 5 to 7 mg samples. DSC run according to ISO 11357/part 3/method $C_2$ in a heat/cool/heat cycle with a scan rate of 10° C./min in the temperature range of −30 to +230° C. Crystallization temperature was determined from the cooling step, while melting temperature was determined from the heating scan.

Intrinsic viscosity is measured according to DIN ISO 1628/1, October 1999 (in Decalin at 135° C.).

Density is measured according to ISO 1183-187. Sample preparation is done either by compression moulding in accordance with ISO 1872-2:2007 or 10×10×2 mm specimen were cut from foamed injection-moulded parts.

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

Flexural Modulus: The flexural modulus was determined in 3-point-bending according to ISO 178 on 80×10×4 mm$^3$ test bars injection molded at 23° C. in line with EN ISO 1873-2.

Charpy notched impact test: The charpy notched impact strength (Charpy NIS) was measured according to ISO 179 2C/DIN 53453 at 23° C. and −20° C., using injection molded bar test specimens of 80×10×4 mm prepared in accordance with ISO 294-1:1996.

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° L/min.

Surface Appearance of Compact and Foamed Parts

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system.

A schematic setup is given in figure 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error average (MSEaverage) or mean square error maximum (MSEmax) values are calculated allowing a quantification of surface quality/homogeneity, i.e. the higher the MSE value the more pronounced is the surface defect. MSEaverage and MSEmax values are not comparable. Generally, for one and the same material, the tendency to flow marks increases when the injection speed is increased.

The MSEaverage values were collected on compact injection-moulded plaques 440×148×2.8 mm produced with grain G1. The plaques were injection-moulded with different filling times of 1.5, 3 and 6 sec respectively.

Further Conditions:

Melt temperature: 240° C.

Mould temperature 30° C.

Dynamic pressure: 10 bar hydraulic

The MSEmax values were collected on compact and foamed injection-moulded plaques 210×148×2 mm produced with a one-point gating system and a grain marked here as G2, which differs from G1. The plaques were injection-moulded with filling time of 0.8 s. Hydrocerol ITP 825 from Clariant, with a decomposition temperature of 200° C. was used as a chemical blowing agent. The blowing agent was added during the conversion step in a form of a masterbatch, which contains 40% of active substance defined as a citric acid [www.clariant.com].

Cell structure of the foamed parts was determined by light microscopy from a cross-section of the foamed injection-molded plate.

Maximum force at break was determined on plaques with dimensions 148×148×2 mm during instrumented falling weight impact testing according to ISO 6603-2. The test was performed at room temperature with a lubricated tup with a diameter of 20 mm and impact velocity of 10 mm/s. The maximum force at break was determined as the maximum peak at the force-deformation curve collected during the test.

Compression test was performed on 10×10×2 mm plaques at room temperature according to ISO 604: 2002. The tests were carried out on a Zwick Z010U machine with a test speed of 0.87 mm/min at room temperature. The compressive stress was determined at 1 mm deformation. Thus, the compressive stress is defined as the force at break at 1 mm deformation divided by the specimen area at the beginning of the experiment.

Puncture energy is determined in the instrumented falling weight test according to ISO 6603-2 using injection moulded plaques of 60×60×1 mm and a test speed of 2.2 m/s, clamped, lubricated striker with 20 mm diameter. The reported puncture energy results from an integral of the failure energy curve measured at (60×60×2 mm).

Compressive stress at break was determined on 10×10×3 mm plaques at room temperature according to ISO 604:

2002. The tests were carried out on a Zwick Z010U machine with a test speed of 0.87 mm/min at room temperature. The compressive stress was determined at 1 mm deformation. Thus, the compressive stress is defined as the force at break at 1 mm deformation divided by the specimen area at the beginning of the experiment.

2. Examples

Preparation of the Catalyst for HECO1a and HECO2a

First, 0.1 mol of MgCl2×3 EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst). 35 ml of mineral oil (Paraffinum Liquidum PL68) was added to a 125 ml stainless steel reactor followed by 0.82 g of triethyl aluminum (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight Preparation of the Catalyst for HECO1b The catalyst for the preparation of HECO1b was prepared analogously to the preparation of the catalyst for HECO1a and HECO2a except that diethylaminotriethoxysilane (donor U) was used instead of dicyclopentyl dimethoxy silane.

Preparation of the Catalyst for HECO2b

The catalyst for the preparation of HECO2b is the commercial catalyst ZN180M by Lyondell Basell used along with dicyclopentyl dimethoxy silane (donor D) as donor.

The aluminum to donor ratio, the aluminum to titanium ratio and the polymerization conditions are indicated in table 1.

TABLE 1

Preparation of HECO1a, HECO1b, HECO2a and HECO2b

|  |  | HECO1a | HECO1b | HECO2a | HECO2b |
|---|---|---|---|---|---|
| Prepolymerization |  |  |  |  |  |
| TEAL/Ti | [mol/mol] | 200 | 205 | 200 | 220 |
| TEAL/donor | [mol/mol] | 10 | 10 | 5.01 | 10 |
| Temperature | [° C.] | 30 | 30 | 30 | 30 |
| res. time | [h] | 0.26 | 0.09 | 0.17 | 0.08 |
| Loop |  |  |  |  |  |
| Temperature | [° C.] | 76 | 72 | 80 | 75 |
| Split | [%] | 35 | 29 | 34 | 52 |
| H2/C3 ratio | [mol/kmol] | 25 | 21 | 7 | 22 |
| C2/C3 ratio | [mol/kmol] | 0 | 0 | 0 | 0 |
| $MFR_2$ | [g/10 min] | 160 | 120 | 162 | 160 |
| XCS | [wt.-%] | 2.1 | 2.2 | 2.0 | 2.0 |
| C2 content | [mol-%] | 0 | 0 | 0 | 0 |
| GPR 1 |  |  |  |  |  |
| Temperature | [° C.] | 80 | 85 | 95 | 80 |
| Pressure | [kPa] | 2400 | 2500 | 1500 | 2200 |
| Split | [%] | 40 | 36 | 45 | 34 |
| H2/C3 ratio | [mol/kmol] | 45 | 204 | 84 | 175 |
| C2/C3 ratio | [mol/kmol] | 0 | 0 | 0 | 0 |
| $MFR_2$ | [g/10 min] | 55 | 120 | 159 | 160 |
| XCS | [wt.-%] | 2.0 | 2.0 | 2.9 | 13.0 |
| IV (XCS) | [dl/g] | nd | nd | nd | nd |
| C2 (XCS) | [mol-%] | nd | nd | nd | nd |
| C2 content | [mol-%] | 0 | 0 | 0 | 0 |
| GPR 2 |  |  |  |  |  |
| Temperature | [° C.] | 67 | 75 | 85 | 80 |
| Pressure | [kPa] | 2100 | 2000 | 1400 | 2190 |
| Split | [%] | 15 | 22 | 21 | 14 |
| C2/C3 ratio | [mol/kmol] | 242 | 701 | 600 | 550 |
| H2/C2 ratio | [mol/kmol] | 23 | 85 | 170 | 250 |
| $MFR_2$ | [g/10 min] | 20 | 40 | 66 | 95 |
| XCS | [wt.-%] | 18 | 18 | 20 | 15 |
| IV (XCS) | [dl/g] | nd | nd | 2.9 | 2.3 |
| C2 (XCS) | [mol-%] | nd | 10.8 | 53 | 20 |
| C2 content | [mol-%] | 10 |  | 18 | 11 |

TABLE 1-continued

Preparation of HECO1a, HECO1b, HECO2a and HECO2b

|  |  | HECO1a | HECO1b | HECO2a | HECO2b |
|---|---|---|---|---|---|
| GPR 3 |  |  |  |  |  |
| Temperature | [° C.] | 67 | 85 |  |  |
| Pressure | bar | 1500 | 1400 |  |  |
| Split | [%] | 10 | 13 |  |  |
| C2/C3 ratio | [mol/kmol] | 250 | 699 |  |  |
| H2/C2 ratio | [mol/kmol] | 22 | 129 |  |  |
| MFR$_2$ | [g/10 min] | 5 | 24 |  |  |
| XCS | [wt.-%] | 25 | 29 |  |  |
| IV (XCS) | [dl/g] | 6.3 | 3.2 |  |  |
| C2 (XCS) | [mol-%] | 25.7 | 56 |  |  |
| C2 content | [mol-%] | 11.2 | 20 |  |  |

C2 ethylene
H2/C3 ratio hydrogen/propylene ratio
C2/C3 ratio ethylene/propylene ratio
H2/C2 ratio hydrogen/ethylene ratio
GPR 1/2/3 1st/2nd/3rd gas phase reactor
Loop Loop reactor A Borstar PP pilot plant comprised of a stirred-tank prepolymerization reactor, a liquid-bulk loop reactor, and one, two or three gas phase reactors (GPR1 to GPR3) were used for the main polymerization. The resulting polymer powders were compounded in a co-rotating twin-screw extruder Coperion ZSK 57 at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-5 butylphenyl) phosphate) phosphite) of BASF AG, Germany) and 0.05 wt.-% calcium stearate.

Preparation of the Composition (C)

Inventive Examples 1 and 2

HECO1a, HECO2a, HECO2b, PL and HDPE were melt blended on a co-rotating twin screw extruder in amounts as indicated in Table 2 with 0.1 wt.-% of Songnox 1010FF (Pentaerythrityl-tetrakis(3-(3',5'-di-tert. butyl-4-hydroxyphenyl)), 0.07 wt.-% Kinox-68 G (Tris (2,4-di-t-butylphenyl) phosphite) from HPL Additives, 0.16 wt % hindered amine light stabilizers which were mixed in a 1:1 blend based on Sabostab UV119 (1,3,5-Triazine-2,4,6-triamine) and Hilite 77(G)(Bis-(2,2,6,6-tetramethyl-4-piperidyl)-sebacate), 0.1 wt % 1,2-cyclohexane dicarboxylic acid and Ca-salt from Miliken and 0.1 wt % Erucamide (13-docosenamide) and 1.47 wt.-% of the polypropylene homopolymer HC001A-B1. The polymer melt mixture was discharged and pelletized.

Comparative Examples 1 and 2

HECO1a and HECO2a and optionally PL and HDPE were melt blended on a co-rotating twin screw extruder in amounts as indicated in Table 2 with 0.1 wt.-% of Songnox 1010FF (Pentaerythrityl-tetrakis(3-(3',5'-di-tert. butyl-4-hydroxyphenyl)), 0.07 wt.-% Kinox-68 G (Tris (2,4-di-t-butylphenyl) phosphite) from HPL Additives, 0.16 wt % hindered amine light stabilizers which were mixed in a 1:1 blend based on Sabostab UV119 (1,3,5-Triazine-2,4,6-triamine) and Hilite 77(G)(Bis-(2,2,6,6-tetramethyl-4-piperidyl)-sebacate), 0.1 wt % NA11UH (Sodium 2,2'-methylene bis-(4,6-di-tert. butylphenyl) phosphate) and 0.1 wt % Erucamide (13-docosenamide) and 1.47 wt.-% of the polypropylene homopolymer HC001A-B 1. The polymer melt mixture was discharged and pelletized.

Comparative Example 3

HECO1b, HECO2b, PL and HDPE were melt blended on a co-rotating twin screw extruder in amounts as indicated in Table 2 with 0.1 wt.-% of Songnox 1010FF (Pentaerythrityl-tetrakis(3-(3',5'-di-tert. butyl-4-hydroxyphenyl)), 0.07 wt.-% Kinox-68 G (Tris (2,4-di-t-butylphenyl) phosphite) from HPL Additives, 0.16 wt % hindered amine light stabilizers which were mixed in a 1:1 blend based on Sabostab UV119 (1,3,5-Triazine-2,4,6-triamine) and Hilite 77(G)(Bis-(2,2,6,6-tetramethyl-4-piperidyl)-sebacate), 0.1 wt % 1,2-cyclohexane dicarboxylic acid and Ca-salt from Miliken and 0.1 wt % Erucamide (13-docosenamide) and 1.47 wt.-% of the polypropylene homopolymer HC001A-B1. The polymer melt mixture was discharged and pelletized.

TABLE 2

Properties of comparative and inventive examples collected on 2 mm compact and chemically injection-moulded foamed plates.

|  |  | IE1 | IE2 | CE1 | CE2 | CE3 |
|---|---|---|---|---|---|---|
| HECO1a | [wt.-%] | 26.50 | 26.50 | 26.50 | 25.50 |  |
| HECO1b | [wt.-%] |  |  |  |  | 26.5 |
| HECO2a | [wt.-%] |  | 38.11 | 42.50 | 56.50 |  |
| HECO2b | [wt.-%] | 38.11 |  |  |  | 37.62 |
| PL | [wt.-%] | 8.00 | 8.00 | 8.00 |  | 8.00 |
| HDPE1 | [wt.-%] | 5.00 | 5.00 |  |  | 5.00 |
| HDPE2 | [wt.-%] |  |  |  | 5.00 |  |

TABLE 2-continued

Properties of comparative and inventive examples collected on 2 mm compact and chemically injection-moulded foamed plates.

|  |  | IE1 | IE2 | CE1 | CE2 | CE3 |
|---|---|---|---|---|---|---|
| Talc1 | [wt.-%] |  |  | 14.50 |  |  |
| Talc2 | [wt.-%] | 14.50 | 14.50 |  | 14.50 | 14.50 |
| Nu1 | [wt.-%] |  |  | 0.10 | 0.10 |  |
| Nu2 | [wt.-%] | 0.10 | 0.10 |  |  | 0.10 |
| Pigments | [wt.-%] | 5.89 | 5.89 | 1.50 | 1.50 | 6.38 |
| Additives | [wt.-%] | 1.90 | 1.90 | 1.90 | 1.90 | 1.90 |
| Properties of compact parts, 2 mm thick | | | | | | |
| MFR | [g/10 min] | 18 | 16 | 20 | 27 | 32 |
| IPT, Energy to max | [J] | 21 | 22 | nd | nd | 21 |
| Flexural Modulus | [MPa] | 2030 | 2007 | 1886 | 2505 | 2072 |
| CLTE (−30/80° C.) | [—] | 87 | 92 | nd | nd | nd |
| Charpy impact strength, +23° C. | [kJ/m$^2$] | 15 | 19 | 14 | 6 | 10 |
| Compressive stress at break | [MPa] | 84 | 92 | 69 | 85 | 78 |
| MSEaverage, 1.5 s, G3 | [—] | 25 | 40 | 45 | nd | 25 |
| Density | [g/cm$^3$] | 1.03 | 1.03 | 1.04 | 1.04 | 1.04 |
| Properties of foamed parts, 3 mm thick | | | | | | |
| Cell size | [μm] | 50 | 50 | 60 | 60 | 70 |
| CLTE (−30/80° C.) | [—] | 95 | 102 | nd | nd | nd |
| Compressive stress at break | [MPa] | 56 | 35 | 30 | 55 | 33 |
| MSEmax, 0.8 s, G2 | [—] | nd | nd | 43 | 43 | nd |
| MSEmax, 1.5 s, G3 | [—] | 40 | 40 | 50 | nd | 120 |
| Density | [g/cm$^3$] | 0.85 | 0.85 | 0.89 | 0.89 | 0.89 |

PL is the commercial ethylene-octene copolymer Queo8230 of Borealis having a density of 0.880 g/cm$^3$, a melt flow rate MFR$_2$ (190° C.) of 30.0 g/10 min and an 1-octene content of 7.0 mol-%.
HDPE1 is the commercial high density polyethylene MB7541 of Borealis
HDPE2 is the commercial high density polyethylene MG9601 of Borealis
Talc1 is the commercial Talc Jetfine 3CA of Luzenac
Talc2 is the commercial Talc HAR T84 of Luzenac
Nu1 is Sodium 2,2'-methylene bis-(4,6-di-tert. butylphenyl) phosphate
Nu2 is 1,2-cyclohexane dicarboxylic acid and Ca-salt from Miliken
Pigments is a masterbatch of 70 wt.-% of linear density polyethylene (LDPE) and 30 wt.-% carbon black, with MFR (190° C./21.6 kg) of 15 g/10 min.
Additives is a masterbatch of Songnox 1010FF (Pentaerythrityl-tetrakis(3-(3',5'-di-tert. butyl-4-hydroxyphenyl)), Kinox-68 G (Tris (2,4-di-t-butylphenyl)phosphite) from HPL Additives, hindered amine light stabilizers which were mixed in a 1:1 blend based on Sabostab UV119 (1,3,5-Triazine-2,4,6-triamine) and Hilite 77(G)(Bis-(2,2,6,6-tetramethyl-4-piperidyl)-sebacate), and Erucamide (13-docosenamide) and the polypropylene homopolymer HC001A-B1as outlined above.

The invention claimed is:

1. A foamed article comprising a polypropylene composition (C), wherein the polypropylene composition (C) comprises:
   a) 15.0 to 35.0 wt. % of a heterophasic propylene copolymer HECO1 having an intrinsic viscosity (IV) of the xylene soluble fraction (XCS) above 3.5 dl/g, wherein the xylene soluble fraction (XCS) is determined at 25° C. according to ISO 16152, said heterophasic propylene copolymer HECO1 comprising:
      i) a matrix being a propylene polymer M1 and
      ii) an elastomeric propylene copolymer E1 being dispersed in said matrix,
   b) 5.0 to 30.0 wt. % of an inorganic filler (F),
   c) 0.001 to 2.0 wt. % of a nucleating agent (NU) being a dicarboxylic acid and/or a salt thereof, and
   further comprising 38.0 to 45.0 wt. % of a heterophasic propylene copolymer HECO2 having an intrinsic viscosity (IV) of the xylene soluble fraction (XCS) in the range of 1.0 to 3.3 dl/g, wherein the xylene soluble fraction (XCS) is determined at 25° C. according to ISO 16152,
   said heterophasic propylene copolymer HECO2 comprising:
      i) a matrix being a propylene polymer M2 and
      ii) an elastomeric propylene copolymer E2 being dispersed in said matrix.

2. The foamed article according to claim 1, wherein the heterophasic propylene copolymer HECO1 has a comonomer content of the xylene soluble fraction (XCS) below 40.0 mol %, wherein the xylene soluble fraction (XCS) is determined at 25° C. according to ISO 16152.

3. The foamed article according to claim 1, wherein the heterophasic propylene copolymer HECO2 has a comonomer content of the xylene soluble fraction (XCS) equal or above 40.0 mol %, wherein the xylene soluble fraction (XCS) is determined at 25° C. according to ISO 16152.

4. The foamed article according to claim 1, further comprising a high density polyethylene (HDPE) and/or a plastomer (PL) being a copolymer of ethylene and a $C_4$ to $C_8$ α-olefin.

5. The foamed article according to claim 4, wherein the plastomer (PL) is a copolymer of ethylene and 1-octene.

6. The foamed article according to claim 1, wherein the heterophasic propylene copolymer HECO1 has:
   i) a melt flow rate MFR$_2$ (230° C.) determined according to ISO 1133 in the range of 1.0 to 20.0 g/10 min, and/or
   ii) a comonomer content in the range of 5.0 to 30.0 mol %, and/or
   iii) a xylene soluble fraction (XCS) in the range of 15.0 to 40.0 wt. %, wherein the xylene soluble fraction (XCS) is determined at 25° C. according to ISO 16152.

7. The foamed article according claim 1, wherein the heterophasic propylene copolymer HECO2 has:
   i) a melt flow rate MFR$_2$ (230° C.) determined according to ISO 1133 in the range of 50 to 120 g/10 min, and/or
   ii) a comonomer content in the range of 4.0 to 30.0 mol %, and/or iii) a xylene soluble fraction (XCS) in the range of 8.0 to 35.0 wt. %, wherein the xylene soluble fraction (XCS) is determined at 25° C. according to ISO 16152.

8. The foamed article according to claim 1, wherein the propylene polymer M1 is a propylene homopolymer.

9. The foamed article according to claim 1, wherein the elastomeric propylene copolymer E1 is a copolymer of propylene and ethylene.

10. The foamed article according to claim 1, having a melt flow rate $MFR_2$ (230° C.) determined according to ISO 1133 in the range of 10.0 to 40.0 g/10 min.

11. The foamed article according to claim 1, wherein the inorganic filler (F) is talc and/or wollastonite.

12. The foamed article according to claim 1, wherein the nucleating agent (NU) is 1,2-cyclohexane dicarboxylic acid and/or a salt thereof.

13. The foamed article according to claim 1, further comprising:
   v) 2.0 to 10.0 wt. % of a high density polyethylene (HDPE), and
   vi) 5.0 to 15.0 wt. % of a plastomer (PL) being a copolymer of ethylene and a $C_4$ to $C_8$ α-olefin,
   based on the overall polypropylene composition (C).

14. The foamed article according to claim 1, wherein the propylene polymer M2 is a propylene homopolymer.

15. The foamed article according to claim 1, wherein the elastomeric propylene copolymer E2 is a copolymer of propylene and ethylene.

16. The foamed article according to claim 1, wherein the polypropylene composition has a melt flow rate $MFR_2$ (230° C.) determined according to ISO 1133 in the range of 14.0 to 28.0 g/10 min.

17. The foamed article according to claim 1, wherein the polypropylene composition (C) comprises:
   a) 22.0 to 27.0 wt. % of the heterophasic propylene copolymer HECO1 having an intrinsic viscosity (IV) of the xylene soluble fraction (XCS) above 3.5 dl/g,
   wherein the xylene soluble fraction (XCS) is determined at 25° C. according to ISO 16152,
   said heterophasic propylene copolymer HECO1 comprising:
      i) the matrix being a propylene polymer M1 and
      ii) the elastomeric propylene copolymer E1 being dispersed in said matrix,
   b) 12.0 to 16.0 wt. % of the inorganic filler (F),
   c) 0.05 to 1.0 wt. % of the nucleating agent (NU) being a dicarboxylic acid and/or a salt thereof,
   further comprising
   38.0 to 45.0 wt. % of the heterophasic propylene copolymer HECO2 having an intrinsic viscosity (IV) of the xylene soluble fraction (XCS) in the range of 1.0 to 3.3 dl/g, wherein the xylene soluble fraction (XCS) is determined at 25° C. according to ISO 16152,
   said heterophasic propylene copolymer HECO2 comprising:
      i) the matrix being a propylene polymer M2 and
      ii) the elastomeric propylene copolymer E2 being dispersed in said matrix,
   4.0 to 6.0 wt. % of a high density polyethylene (HDPE), and
   7.0 to 10.0 wt. % of a plastomer (PL) being a copolymer of ethylene and a $C_4$ to $C_8$ α-olefin, based on the overall polypropylene composition (C).

18. The foamed article according to claim 17, wherein:
said heterophasic propylene copolymer HECO1 comprises
   i) the matrix being a propylene homopolymer M1 and
   ii) the elastomeric copolymer of propylene and ethylene E1 being dispersed in said matrix,
said inorganic filler (F) is talc,
said nucleating agent (NU) is selected from the group consisting of 1,2-cyclohexane dicarboxylic acid, 1,3-cyclohexane dicarboxylic acid, 1,4-cyclohexane dicarboxylic acid, 1,1-cyclobutane dicarboxylic acid, 1,2-cyclopentane dicarboxylic acid and/or salts thereof,
said heterophasic propylene copolymer HECO2 comprises
   i) the matrix being a propylene homopolymer M2 and
   ii) the elastomeric copolymer of propylene and ethylene E2 being dispersed in said matrix, and
said plastomer (PL) is a copolymer of ethylene and a 1-octene.

* * * * *